United States Patent [19]

Guenther et al.

[11] Patent Number: 5,837,013
[45] Date of Patent: Nov. 17, 1998

[54] PREPARATION OF COLORED MELAMINE-FORMALDEHYDE CONDENSATION PRODUCTS

[75] Inventors: Erhard Guenther, Hassloch; Wolfgang Reuther, Heidelberg, both of Germany

[73] Assignee: BASF Aktiengesellschaft, Ludwigshafen, Germany

[21] Appl. No.: 849,954

[22] PCT Filed: Dec. 13, 1995

[86] PCT No.: PCT/EP95/04928

§ 371 Date: Jun. 16, 1997

§ 102(e) Date: Jun. 16, 1997

[87] PCT Pub. No.: WO96/20229

PCT Pub. Date: Jul. 4, 1996

[30] Foreign Application Priority Data

Dec. 23, 1994 [DE] Germany ............... 44 46 386.3

[51] Int. Cl.⁶ ...................................... D06P 3/02
[52] U.S. Cl. .................. 8/49.4; 8/506; 8/520; 8/637.1
[58] Field of Search .................... 8/494, 506, 520; 528/232, 243

[56] References Cited

U.S. PATENT DOCUMENTS

| | | |
|---|---|---|
| 4,182,701 | 1/1980 | Cottrell, Jr. . |
| 4,886,882 | 12/1989 | Ebel et al. . |
| 4,996,289 | 2/1991 | Berbner et al. . |
| 5,162,487 | 11/1992 | Weiser et al. . |
| 5,322,915 | 6/1994 | Weiser et al. ................ 528/163 |
| 5,494,616 | 2/1996 | Voelker et al. . |

FOREIGN PATENT DOCUMENTS

| | | |
|---|---|---|
| 355 760 | 2/1990 | European Pat. Off. . |
| 408 947 | 1/1991 | European Pat. Off. . |
| 469 166 | 2/1992 | European Pat. Off. . |
| 523 485 | 1/1993 | European Pat. Off. . |
| 601 402 | 6/1994 | European Pat. Off. . |
| 624 665 | 11/1994 | European Pat. Off. . |

*Primary Examiner*—Margaret Einsmann
*Attorney, Agent, or Firm*—Keil & Weinkauf

[57] ABSTRACT

A process for preparing colored melamine-formaldehyde condensation products by:

(A) dispersing a mixture consisting essentially of
  (a) a substituted melamine of the formula I

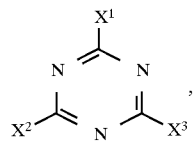

where $X^1$, $X^2$ and $X^3$ are each as disclosed hereinafter, and
  (b) if desired, formaldehyde or formaldehyde-donating compounds in a molar ratio of formaldehyde to melamines I within the range from 40:1 to 0,
  (c) a pigment or dye, and mixing
  (d) if desired, phenol, unsubstituted or substituted.

by intensive stirring until there are no longer any pigment agglomerates $\geq 1$ $\mu$m,
and then (B) admixing the mixture prepared in (A) with melamine and if desired with further phenol, substituted melamine I and formaldehyde or formaldehyde-donating compounds, and condensing.

9 Claims, No Drawings

PREPARATION OF COLORED MELAMINE-FORMALDEHYDE CONDENSATION PRODUCTS

The present invention relates to an improved process for preparing colored melamine-formaldehyde condensation products by mixing pigments or dyes into a reaction mixture comprising starting compounds for preparing the melamine-formaldehyde condensation products.

The present invention further relates to colored melamine-formaldehyde condensation products and to their use for producing colored articles, in particular fibers and webs.

EP-A 523485 describes melamine-formaldehyde condensation products produced with or without inclusion in the reaction mixture of additives such as pigments or dyes. The disadvantage of this unspecific procedure is that inhomogeneously colored condensation products are obtained for some applications, in particular in fiber and web manufacture. Furthermore, from experience to date, the spinning solutions frequently contain fisheyes which can cause blockage of the pipework and orifices.

It is an object of the present invention to provide an improved process for preparing colored melamine-formaldehyde condensation products that is free of the abovementioned disadvantages.

We have found that this object is achieved by a process for preparing colored melamine-formaldehyde condensation products by mixing pigments or dyes into a reaction mixture comprising starting compounds for preparing the melamine-formaldehyde condensation products, which comprises (A) dispersing a mixture consisting essentially of
  (a) a substituted melamine of the formula I

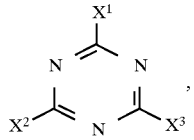

where $X^1$, $X^2$ and $X^3$ are each selected from the group consisting of $-NH_2$, $-NHR^1$ and $-NR^1R^2$, and $X^1$, $X^2$ and $X^3$ are not all $-NH_2$, and $R^1$ and $R^2$ are each selected from the group consisting of hydroxy-$C_2$–$C_{10}$-alkyl, hydroxy-$C_2$–$C_4$-alkyl-(oxa-$C_2$–$C_4$-alkyl)$_n$, where n is from 1 to 5, and amino-$C_2$–$C_{12}$-alkyl, or mixtures of melamines I, and (b) if desired, formaldehyde or formaldehyde-donating compounds in a molar ratio of formaldehyde to melamines I within the range from 40:1 to 0,
  (c) a pigment or dye, and
  (d) if desired, phenol, unsubstituted or substituted by radicals selected from the group consisting of $C_1$–$C_9$-alkyl and hydroxyl, $C_1$–$C_4$-alkanes substituted by 2 or 3 phenol groups, di(hydroxyphenyl) sulfones or mixtures thereof, the pigment or dye being added in an amount within the range from 0.01 to 30% by weight, based on (a) and (b), and the phenol in an amount within the range from 0 to 5 mol %, based on (a) and (b),
by intensive stirring until there are no longer any pigment agglomerates $\geq 1$ $\mu$m,
and then
(B) admixing the mixture prepared in (A) with melamine and if desired with further phenol, substituted melamine I and formaldehyde or formaldehyde-donating compounds, the amounts being chosen so that the molar ratio of melamines (melamine and (a)) to (b) is within the range from 1:1.15 to 1:4.5, the pigment or dye is present in an amount within the range from 0.01 to 5% by weight, based on melamine and (a) and (b), and the phenol is present in an amount within the range from 0 to 5 mol %, based on melamine and (a) and (b), and then condensing in a conventional manner.

We have also found colored melamine-formaldehyde condensation products and their use for producing colored articles, in particular fibers and webs.

First step (A) of the process for the present invention comprises dispersing a mixture consisting essentially of
  (a) a substituted melamine of the formula I

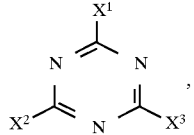

where $X^1$, $X^2$ and $X^3$ are each selected from the group consisting of $-NH_2$, $-NHR^1$ and $-NR^1R^2$, and $X^1$, $X^2$ and $X^3$ are not all $-NH_2$, and $R^1$ and $R^2$ are each selected from the group consisting of hydroxy-$C_2$–$C_{10}$-alkyl, hydroxy-$C_2$–$C_4$-alkyl-(oxa-$C_2$–$C_4$-alkyl)$_n$, where n is from 1 to 5, and amino-$C_2$–$C_{12}$-alkyl, or mixtures of melamines I, and (b) if desired, formaldehyde or formaldehyde-donating compounds in a molar ratio of formaldehyde to melamines I within the range from 40:1 to 0, preferably from 25:1 to 0,
  (c) a pigment or dye, and
  (d) if desired, phenol, unsubstituted or substituted by radicals selected from the group consisting of $C_1$–$C_9$-alkyl and hydroxyl, $C_1$–$C_4$-alkanes substituted by 2 or 3 phenol groups, di(hydroxyphenyl) sulfones or mixtures thereof, the pigment or dye being added in an amount within the range from 0.01 to 30, preferably from 0.5 to 15,% by weight, based on (a) and (b), and the phenol in an amount within the range from 0 to 5, preferably from 0.2 to 2, mol %, based on (a) and (b), by intensive stirring until there are no longer any pigment agglomerates $\geq 1$ $\mu$m.

Suitable for use as substituted melamines of the general formula I

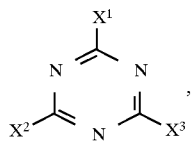

are those in which $X^1$, $X^2$ and $X^3$ are each selected from the group consisting of $-NH_2$, $-NHR^1$ and $-NR^1R^2$, but $X^1$, $X^2$ and $X^3$ are not all $-NH_2$, and $R^1$ and $R^2$ are each selected from the group consisting of hydroxy-$C_2$–$C_{10}$-alkyl, hydroxy-$C_2$–$C_4$-alkyl-(oxa-$C_2$–$C_4$-alkyl)$_n$, where n is from 1 to 5, and amino-$C_2$–$C_{12}$-alkyl.

Hydroxy-$C_2$–$C_{10}$-alkyl is preferably hydroxy-$C_2$–$C_6$-alkyl such as 2-hydroxyethyl, 3-hydroxy-n-propyl, 2-hydroxyisopropyl, 4-hydroxy-n-butyl, 5-hydroxy-n-pentyl, 6-hydroxy-n-hexyl, 3-hydroxy-2,2-dimethylpropyl, preferably hydroxy-$C_2$–$C_4$-alkyl such as 2-hydroxyethyl, 3-hydroxy-n-propyl, 2-hydroxyisopropyl and 4-hydroxy-n-butyl, particularly preferably 2-hydroxyethyl and 2-hydroxyisopropyl.

Hydroxy-$C_2$–$C_4$-alkyl-(oxa-$C_2$–$C_4$-alkyl)$_n$ preferably has n from 1 to 4, particularly preferably n 1 or 2 such as 5-hydroxy-3-oxa-pentyl, 5-hydroxy-3-oxa-2,5-dimethylpentyl, 5-hydroxy-3-oxa-1,4-dimethylpentyl, 5-hydroxy-3-oxa-1,2,4,5-tetramethylpentyl, 8-hydroxy-3,6-dioxaoctyl.

Amino-$C_2$–$C_{12}$-alkyl is preferably amino-$C_2$–$C_8$-alkyl, such as 2-arinoethyl, 3-aminopropyl, 4-aminobutyl, 5-aminopentyl, 6-aminohexyl, 7-aminoheptyl or 8-aminooctyl, particularly preferably 2-aminoethyl or 6-aminohexyl, very particularly preferably 6-aminohexyl.

Particularly suitable substituted melamines for the present invention include for example the following compounds: 2-hydroxyethylamino-substituted melamines such as 2-(:2-hydroxyethylamino)-4,6-diamino-1,3,5-triazine, 2,4-di(2-hydroxyethylamino)-6-amino-1,3,5-triazine, 2,4,6-tris(2-hydroxy-ethylamino)-1,3,5-triazine, 2-hydroxyisopropylamino-substituted melamines such as 2-(2-hydroxyisopropylamino)-4,6-diamino-1,3,5-triazine, 2,4-di(2-hydroxyisopropylamino)-6-amino-1,3,5-triazine, 2,4,6-tris(2-hydroxyisopropylamino)-1,3,5-triazine, 5-hydroxy-3-oxapentylamino-substituted melamines such as 2-(5-hydroxy-3-oxapentylamino)-4,6-diamino-1,3,5-triazine, 2,4-di(5-hydroxy-3-oxapentylamino)-6-amino-1,3, 5-triazine, 2,4,6-tris-(5-hydroxy-3-oxapentylamino)-1,3,5-triazine, 6-aminohexylamino-substituted melamines such as 2-(6-aminohexylamino)-4,6-diamino-1,3,5-triazine, 2,4-di (6-aminohexylamino)-6-amino-1,3,5-triazine, 2,4,6-tris(6-aminohexylamino)-1,3,5-triazine or mixtures thereof, for example a mixture of 10 mol % of 2-(5-hydroxy-3-oxapentyl-amino)-4,6-diamino-1,3,5-triazine, 50 mol % of 2,4-di(5-hydroxy-3-oxapentylamino)-6-amino-1,3,5-triazine and 40 mol % of 2,4,6-tris(5-hydroxy-3-oxapentylamino)-1,3,5-triazine.

Formaldehyde is generally used in the form of an aqueous solution having a concentration from for example 40 to 50% by weight or in the form of compounds which donate formaldehyde, for example in the form of oligomeric or polymeric formaldehyde in solid form, such as paraformaldehyde, 1,3,5-trioxane or 1,3,5,7-tetroxocane.

Suitable phenols include phenols containing one or two hydroxyl groups such as phenol, unsubstituted or substituted by radicals selected from the group consisting of $C_1$–$C_9$-alkyl and hydroxyl and also $C_1$–$C_4$-alkanes substituted by 2 or 3 phenol groups, di(hydroxyphenyl) sulfones or mixtures thereof.

Preferred phenols include for example phenol, 4-methylphenol, 4-tert-butylphenol, 4-n-octylphenol, 4-n-nonylphenol, pyrocatechol, resorcinol, hydroquinone, 2,2-bis(4-hydroxyphenyl)-propane or 4,4'-dihydroxydiphenyl sulfone, particularly preferably phenol, resorcinol and 2,2-bis(4-hydroxyphenyl)-propane.

The dyes employed in the process of the present invention come from the class of the azo, anthraquinone, coumarin, methine or azamethine, quinophthalone or nitro dyes. They either are free of ionic groups or carry carboxyl and/or sulfo groups.

Suitable dyes which are free of ionic groups will now be more particularly described.

Suitable azo dyes include in particular monoazo or disazo dyes, for example those with a diazo component derived from an aniline or from a five-membered aromatic heterocyclic amine which has from one to three hetero atoms selected from the group consisting of nitrogen, oxygen and sulfur in the heterocyclic ring and may be fused with a benzene, thiophene, pyridine or pyrimidine ring.

Important monoazo or disazo dyes include for example those whose diazo component is derived for example from an aniline or from a heterocyclic amine of the pyrrole, furan, thiophene, pyrazole, imidazole, oxazole, isoxazole, thiazole, isothiazole, triazole, oxadiazole, thiadiazole, benzofuran, benzothiophene, benzimidazole, benzoxazole, benzothiazole, benzisothiazole, pyridothiophene, pyrimidothiophene, thienothiophene or thienothiazole series.

Of particular suitability are those diazo components which come from an aniline or from a heterocyclic amine of the pyrrole, thiophene, pyrazole, thiazole, isothiazole, triazole, thiadiazole, benzothiophene, benzothiazole, benzisothiazole, pyridothiophene, pyrimidothiophene, thienothiophene or thienothiazole series.

Also of importance are azo dyes with a coupling component of the aniline, aminonaphthalene, aminothiazole, diaminopyridine or hydroxypyridone series.

Of particular importance are azo dyes of the formula IIa

$$D^1-N=N-K^1 \qquad (IIa),$$

where $D^1$ is a radical of the formula

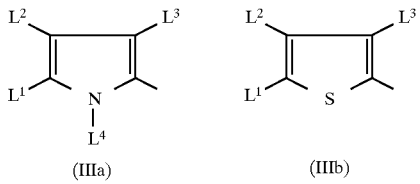

(IIIa)　　　　　　　　(IIIb)

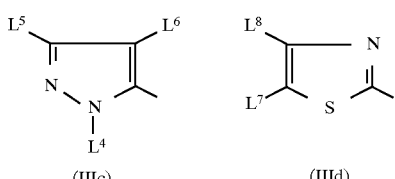

(IIIc)　　　　　　　　(IIId)

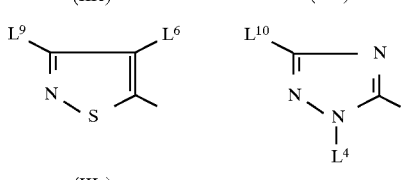

(IIIe)　　　　　　　　(IIIf)

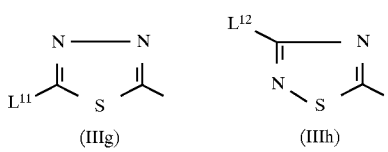

(IIIg)　　　　　　　　(IIIh)

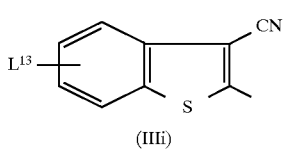

(IIIi)

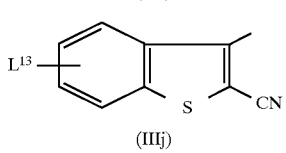

(IIIj)

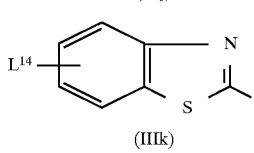

(IIIk)

-continued

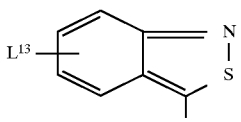
(IIIl)

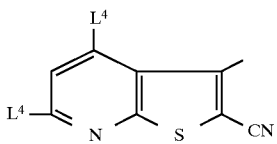
(IIIm)

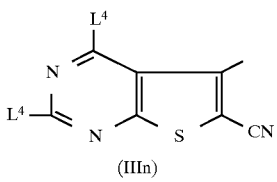
(IIIn)

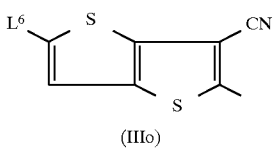
(IIIo)

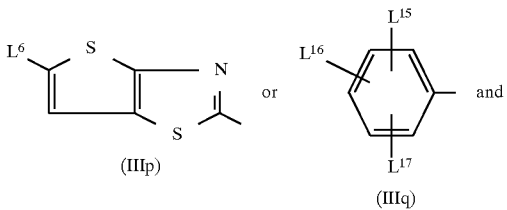
(IIIp)    (IIIq)

K is hydroxyphenyl or a radical of the formula

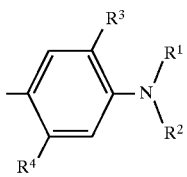
(IVa)

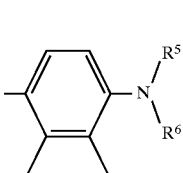
(IVb)

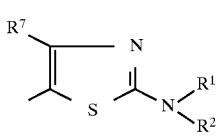
(IVc)

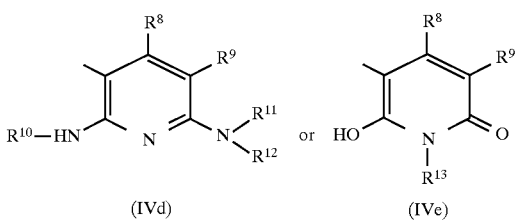
(IVd)    (IVe)

where $L^1$ is nitro, cyano, $C_1$–$C_6$-alkanoyl, benzoyl, $C_1$–$C_6$-alkylsulfonyl, substituted or unsubstituted phenylsulfonyl or a radical of the formula —CH═T, where T is hydroxyimino, $C_1$–$C_4$-alkoxyimino or a radical of an acidic—CH compound, $L^2$ is hydrogen, $C_1$–$C_6$-alkyl, halogen, hydroxyl, mercapto, unsubstituted or phenyl- or $C_1$–$C_4$-alkoxy-substituted $C_1$–$C_6$-alkoxy, substituted or unsubstituted phenoxy, unsubstituted or phenyl-substituted $C_1$–$C_6$-alkylthio, substituted or unsubstituted phenylthio, $C_1$–$C_6$-alkylsulfonyl or substituted or unsubstituted phenylsulfonyl, $L^3$ is cyano, $C_1$–$C_4$-alkoxycarbonyl or nitro, $L^4$ is hydrogen, $C_1$–$C_6$-alkyl or phenyl, $L^5$ is $C_1$–$C_6$-alkyl or phenyl, $L^6$ is hydrogen, cyano, $C_1$–$C_4$-alkoxycarbonyl, $C_1$–$C_6$-alkanoyl, thiocyanato or halogen, $L^7$ is nitro, cyano, $C_1$–$C_6$-alkanoyl, benzoyl, $C_1$–$C_4$-alkoxy-carbonyl, $C_1$–$C_6$-alkylsulfonyl, substituted or unsubstituted phenylsulfonyl or a radical of the formula —CH═T, where T is as defined above, $L^8$ is hydrogen, $C_1$–$C_6$-alkyl, cyano, halogen, unsubstituted or phenyl- or $C_1$–$C_4$-alkoxy-substituted $C_1$–$C_6$-alkoxy, unsubstituted or phenyl-substituted $C_1$–$C_6$-alkylthio, substituted or unsubstituted phenylthio, $C_1$–$C_6$-alkylsulfonyl, substituted or unsubstituted phenylsulfonyl or $C_1$–$C_4$-alkoxycarbonyl, $L^9$ is cyano, unsubstituted or phenyl-substituted $C_1$–$C_6$-alkyl, unsubstituted or phenyl-substituted $C_1$–$C_6$-alkylthio, substituted or unsubstituted phenyl, thienyl, $C_1$–$C_4$-alkyl-thienyl, pyridyl or $C_1$–$C_4$-alkylpyridyl, $L^{10}$ is phenyl or pyridyl, $L^{11}$ is trifluoromethyl, nitro, $C_1$–$C_6$-alkyl, phenyl, unsubstituted or phenyl-substituted $C_1$–$C_6$-alkylthio or $C_1$–$C_6$-dialkylamino, $L^{12}$ is $C_1$–$C_6$-alkyl, phenyl, 2-cyanoethylthio or 2-($C_1$–$C_4$-alkoxy-carbonyl)ethylthio, $L^{13}$ is hydrogen, nitro or halogen, $L^{14}$ is hydrogen, cyano, $C_1$–$C_4$-alkoxycarbonyl, nitro or halogen, $L^{15}$, $L^{16}$ and $L^{17}$ are identical or different and each is independently of the others hydrogen, $C_1$–$C_6$-alkyl, $C_1$–$C_6$-alkoxy, halogen, nitro, cyano, substituted or unsubstituted $C_1$–$C_4$-alkoxycarbonyl, $C_1$–$C_6$-alkylsulfonyl, substituted or unsubstituted phenylsulfonyl or substituted or unsubstituted phenylazo, $R^1$ and $R^2$ are identical or different and each is independently of the other hydrogen, substituted or unsubstituted $C_1$–$C_6$-alkyl, with or without interruption by 1 or 2 oxygen atoms in ether function, $C_5$–$C_7$-cycloalkyl or $C_3$–$C_6$-alkenyl, $R^3$ is hydrogen, $C_1$–$C_6$-alkyl or $C_1$–$C_6$-alkoxy, $R^4$ is hydrogen, $C_1$–$C_6$-alkyl, $C_1$–$C_6$-alkoxy, $C_1$–$C_6$-alkylsulfonylamino, substituted or unsubstituted $C_1$–$C_6$-alkanoylamino or benzoylamino, $R^5$ and $R^6$ are identical or different and each is independently of the other hydrogen or $C_1$–$C_6$-alkyl, $R^7$ is hydrogen, substituted or unsubstituted phenyl or thienyl, $R^8$ is hydrogen or $C_1$–$C_6$-alkyl, $R^9$ is cyano, carbamoyl or acetyl, $R^{10}$, $R^{11}$ and $R^{12}$ are identical or different and each is independently of the others substituted or unsubstituted $C_1$–$C_{12}$-alkyl, with or without interruption by 1 to 3 oxygen atoms in ether function, $C_5$–$C_7$-cycloalkyl, substituted or unsubstituted phenyl, $C_3$–$C_6$-alkenyl, substituted or unsubstituted benzoyl, $C_1$–$C_8$-alkanoyl, $C_1$–$C_6$-alkylsulfonyl or substituted or unsubstituted phenylsulfonyl, or $R^{11}$ and $R^{12}$ together with the nitrogen atom joining them together are a 5- or 6-membered saturated heterocyclic radical with or without further hetero atoms, and $R^{13}$ is hydrogen or $C_1$–$C_6$-alkyl.

Suitable anthraquinone dyes come for example from the class of the 1-aminoanthraquinones. They conform for example to the formula Va, Vb, Vc or Vd

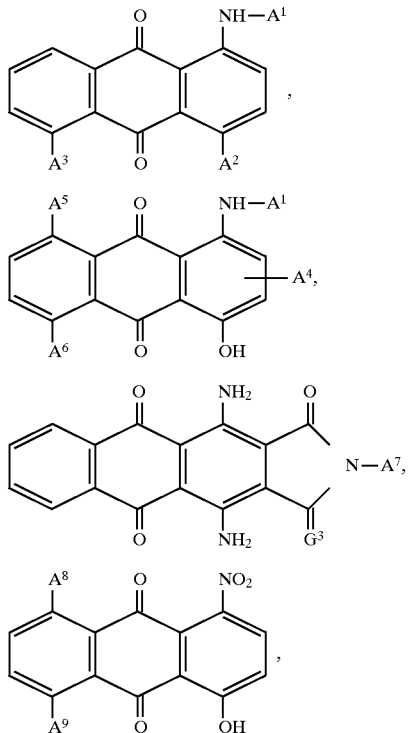

where
A¹ is hydrogen, $C_1$–$C_8$-alkyl or substituted or unsubstituted phenyl,
A² is hydroxyl or the radical NH—A¹,
A³ is hydrogen or nitro,
A⁴ is halogen, hydroxyphenyl, $C_1$–$C_4$-alkoxyphenyl or a radical of the formula

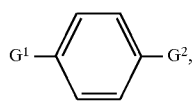

where G¹ is oxygen or sulfur and G² is hydrogen or $C_1$–$C_8$-monoalkylsulfamoyl whose alkyl chain may be interrupted by 1 or 2 oxygen atoms in ether function,
one of the two radicals A⁵ and A6 is hydroxyl and the other is NH—A¹ or A⁵ and A6 are each hydrogen,
A⁷ is hydrogen or $C_1$–$C_8$-alkyl with or without interruption by from 1 to 3 oxygen atoms in ether function,
one of the two radicals A⁸ and A⁹ is hydroxyl and the other is aniline, and
G³ is oxygen or imino.

Suitable coumarin dyes come for example from the class of the 7-dialkylaminocoumarins. They conform for example to the formula VIa, VIb or VIc

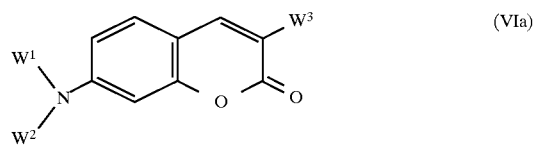

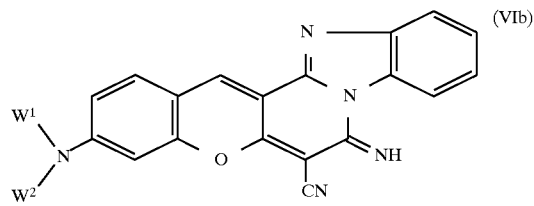

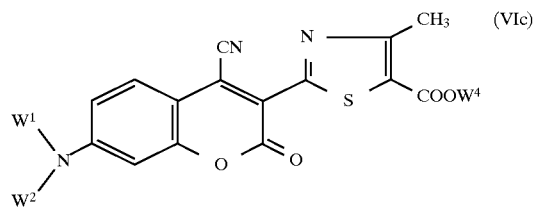

where
W¹ and W² are independently of each other $C_1$–$C_4$-alkyl,
W³ is benzimidazol-2-yl, 5-chlorobenzoxazol-2-yl, benzothiazol-2-yl, 4-hydroxyquinazolin-2-yl or 5-phenyl-1,3,4-thiadiazol-2-yl, and
W⁴ is $C_1$–$C_8$-alkyl.

Suitable methine or azamethine dyes come for example from the class of the triazolopyridines or pyridines. They conform for exaiple to the formula VIIa or VIIb

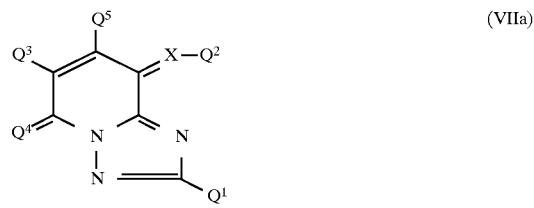

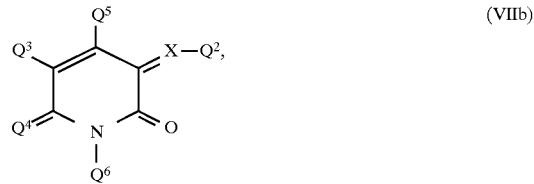

where
X is nitrogen or CH,
Q¹ is $C_1$–$C_{20}$-alkyl with or without substitution and with or without interruption by one or more oxygen atoms in ether function, substituted or unsubstituted phenyl or hydroxyl,
Q² is a 5-membered aromatic heterocyclic radical,
Q³ is hydrogen, cyano, carbamoyl, carboxyl or $C_1$–$C_4$-alkoxycarbonyl,
Q⁴ is oxygen or a radical of the formula C(CN)₂, C(CN)COOE¹ or C(COOE¹)₂, where E¹ is in each case $C_1$–$C_8$-alkyl with or without interruption by 1 or 2 oxygen atoms in ether function,
Q⁵ is hydrogen or $C_1$–$C_4$-alkyl,
Q⁶ is $C_1$–$C_{20}$-alkyl with or without substitution and with or without interruption by one or more oxygen atoms in ether function, substituted or unsubstituted phenyl, hydroxyl or a radical of the formula $NE^2E^3$, where $E^2$ and $E^3$ are identical or different and each is independently of the other hydrogen, substituted or unsubstituted $C_1$–$C_{12}$-alkyl, $C_5$–$C_7$-cycloalkyl, substituted or unsubstituted phenyl, substituted or unsubstituted pyridyl, substituted or unsubstituted $C_1$–$C_{12}$-alkanoyl, $C_1$–$C_{12}$-alkoxycarbonyl, substituted or unsubstituted $C_1$–$C_{12}$-alkylsulfonyl, $C_5$–$C_7$-cycloalkylsulfonyl, substituted or unsubstituted phenylsulfonyl, substituted or unsubstituted pyridylsulfonyl, substituted or unsubstituted benzoyl, pyridylcarbonyl or thienylcarbonyl, or $E^2$ and $E^3$ together with the nitrogen atom joining them together are unsubstituted or $C_1$–$C_4$-alkyl-substituted succinimido, unsubstituted or $C_1$–$C_4$-alkyl-substituted phthalimido or a five- or six-membered saturated heterocyclic radical with or without further hetero atoms.

The dyes of the formula VIIa or VIIb can exist in a plurality of tautomeric forms which are all encompassed by the claims. For example, the compounds of the formula VIIa (where $Q^4$=oxygen and $Q^5$=methyl) can exist inter alia in the following tautomeric forms:

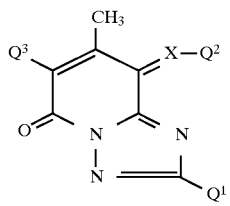

or

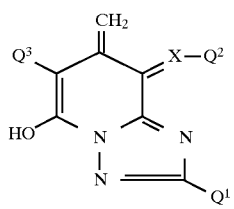

$Q^2$ can be derived for example from components of the pyrrole, thiazole, thiophene or indole series.

Important $Q^2$ radicals are for example those of the formulae VIIIa to VIIId

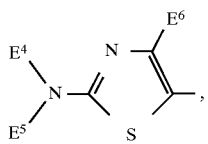 (VIIIa)

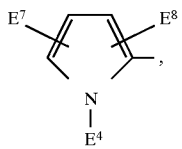 (VIIIb)

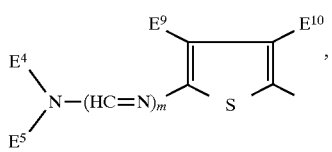 (VIIIc)

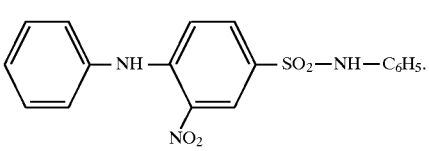 (VIIId)

where
m is 0 or 1,
$E^4$ and $E^5$ are identical or different and are each independently of the other hydrogen or else the abovementioned radical $R^1$, except for hydroxyl, or together with the nitrogen atom joining them together are a 5- or 6-membered saturated heterocyclic radical with or without further hetero atoms,
$E^6$ is hydrogen, halogen, $C_1$–$C_8$-alkyl, unsubstituted or $C_1$–$C_4$-alkyl- or $C_1$–$C_4$-alkoxy-substituted phenyl, unsubstituted or $C_1$–$C_4$-alkyl- or $C_1$–$C_4$-alkoxy-substituted benzyl, cyclohexyl, thienyl, hydroxyl or mono-($C_1$–$C_8$-alkyl)amino,
$E^7$ and $E^8$ are independently of each other hydrogen, hydroxyl, unsubstituted or phenyl- or $C_{1-4}$-alkylphenyl-substituted $C_1$–$C_8$-alkyl, unsubstituted or phenyl- or $C_{1-4}$-alkylphenyl-substituted $C_{1-8}$-alkoxy, $C_{1-8}$-alkanoylamino, $C_{1-8}$-alkylsulfonylamino or mono- or di($C_{1-8}$-alkyl)aminosulfonylamino,
$E^9$ is cyano, carbamoyl, mono- or di($C_1$–$C_8$-alkyl) carbamoyl, $C_{1-8}$-alkoxycarbonyl or substituted or unsubstituted phenyl, and
$E^{10}$ is halogen, hydrogen, $C_{1-4}$-alkyl, $C_{1-4}$-alkoxy, $C_{1-4}$-alkylthio, unsubstituted or $C_1$–$C_4$-alkyl- or $C_{1-4}$-alkoxy-substituted phenyl or thienyl.

Particularly suitable quinophthalone dyes have a quinoline ring which is either unsubstituted or halogen-substituted in ring position 4. They conform for example to the formula IX

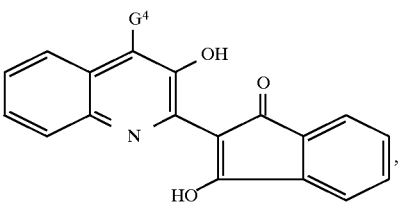 (IX)

where $G^4$ is hydrogen, chlorine or bromine.

A suitable nitro dye conforms for example to the formula X

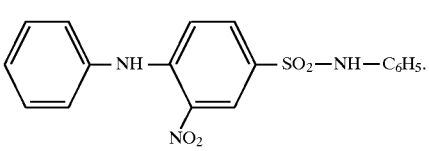 (X)

Any alkyl or alkenyl appearing in the abovementioned formulae may be straight-chain or branched.

Any substituted alkyl appearing in the abovementioned formulae may have as substituents for example, unless otherwise stated, cyclohexyl, phenyl, $C_1$–$C_4$-alkylphenyl, $C_{1-4}$-alkoxyphenyl, halophenyl, $C_1$–$C_8$-alkanoyloxy, $C_{1-8}$-alkylaminocarbonyloxy, $C_1$–$C_{20}$-alkoxycarbonyl, $C_1$–$C_{20}$-alkoxycarbonyloxy, in which case the alkyl chain in the last two radicals mentioned may be interrupted by from 1 to 4 oxygen atoms in ether function and/or may be phenyl- or phenoxy-substituted, cyclohexyloxy, phenoxy, halogen, hydroxyl or cyano. The number of substituents in substituted alkyl is generally 1 or 2.

In any oxygen-interrupted alkyl appearing in the above-mentioned formulae the number of interrupting oxygen atoms in ether function, unless otherwise stated, is preferably from 1 to 4, especially 1 or 2.

Any substituted phenyl or pyridyl appearing in the above-mentioned formulae may have as substituents for example, unless otherwise stated, $C_1$–$C_8$-alkyl, $C_1$–$C_8$-alkoxy, halogen, especially chlorine or bromine, nitro or carboxyl. The number of substituents in substituted phenyl or pyridyl is generally from 1 to 3.

Examples will now be mentioned of the radicals in the formulae II to V.

$L^2$, $L^4$, $L^5$, $L^8$, $L^9$, $L^{11}$, $L^{12}$, $L^{15}$, $L^{16}$, $L^{17}$, $R^1$, $R^2$, $R^3$, $R^4$, $R^5$, $R^6$, $R^8$, $R^{10}$, $R^{11}$, $R^{12}$ and $R^{13}$ are each for example methyl, ethyl, propyl, isopropyl, butyl, isobutyl, sec-butyl, pentyl, isopentyl, neopentyl, tert-pentyl, hexyl or 2-methylpentyl.

$L^9$ may also be for example benzyl or 1- or 2-phenylethyl.

$L^2$, $L^8$, $L^9$ and $L^{11}$ may each also be for example methylthio, ethylthio, propylthio, isopropylthio, butylthio, isobutylthio, pentylthio, hexylthio, benzylthio or 1- or 2-phenylethylthio.

$L^2$ and $L^8$ may each also be for example phenylthio, 2-methylphenylthio, 2-methoxyphenylthio or 2-chlorophenylthio.

$L^2$, $L^8$, $L^{15}$, $L^{16}$, $L^{17}$, $R^3$ and $R^4$ may each also be for example methoxy, ethoxy, propoxy, isopropoxy, butoxy, isobutoxy, sec-butoxy, pentyloxy, isopentyloxy, neopentyloxy, tert-pentyloxy, hexyloxy or 2-methylpentyloxy.

$L^6$ is and each of $L^2$, $L^8$, $L^{13}$, $L^{14}$, $L^{15}$, $L^{16}$ and $L^{17}$ may further also be for example fluorine, chlorine or bromine.

$L^7$ is and each of $L^1$, $L^2$, $L^8$, $L^{15}$, $L^{16}$, $L^{17}$, $R^{10}$, $R^{11}$ and $R^{12}$ may further also be for example methylsulfonyl, ethylsulfonyl, propylsulfonyl, isopropylsulfonyl, butylsulfonyl, isobutylsulfonyl, sec-butylsulfonyl, pentylsulfonyl, isopentylsulfonyl, neopentylsulfonyl, hexylsulfonyl, phenylsulfonyl, 2-methylphenylsulfonyl, 2-methoxyphenylsulfonyl or 2-chlorophenylsulfonyl.

$L^3$ is and each of $L^6$, $L^7$, $L^8$, $L^{14}$, $L^{15}$ $L^{16}$ and $L^{17}$ may further also be for example methoxycarbonyl, ethoxycarbonyl, propoxycarbonyl, isopropoxycarbonyl, butoxycarbonyl, isobutoxycarbonyl or sec-butoxycarbonyl.

$L^{15}$, $L^{16}$ and $L^{17}$ may each also be for example 2-phenoxyethoxycarbonyl, 2- or 3-phenoxypropoxycarbonyl, 2- or 4-phenoxybutoxycarbonyl, phenylazo, 4-nitrophenylazo or 2,4-dinitro-6-bromophenylazo.

$L^2$ and $L^8$ may each also be for example 2-methoxyethoxy, 2-ethoxyethoxy, 2- or 3-methoxypropoxy, 2- or 3-ethoxypropoxy, 2- or 4-methoxybutoxy, 2- or 4-ethoxybutoxy, 5-methoxypentyloxy, 5-ethoxypentyloxy, 6-methoxyhexyloxy, 6-ethoxyhexyloxy, benzyloxy or 1- or 2-phenylethoxy.

$L^{11}$ may also be for example dimethylamino, diethylamino, dipropylamino, diisopropylamino, dibutylamino, dipentylamino, dihexylamino or N-methyl-N-ethylamino.

$L^{12}$ may also be for example 2-methoxycarbonylethylthio or 2-ethoxycarbonylethylthio.

$R^1$, $R^2$, $R^{11}$, $R^{12}$ and $R^{13}$ may each also be for example cyclopentyl, cyclohexyl or cycloheptyl.

$L^9$ may also be for example phenyl, 2-, 3- or 4-methylphenyl, 2,4-dimethylphenyl, 2-, 3- or 4-methoxyphenyl, 2-, 3- or 4-chlorophenyl, 2- or 3-methylthienyl or 2-, 3- or 4-methylpyridyl.

$L^1$, $L^6$ and $L^7$ may each also be for example formyl, acetyl, propionyl, butyryl, pentanoyl or hexanoyl.

In a —CH═T radical $L^1$ or $L^7$ where T is derived from an acidic—CH compound $H_2T$ said acidic—CH compounds $H_2T$ can for example be compounds of the formula

 (XIa)

 (XIb)

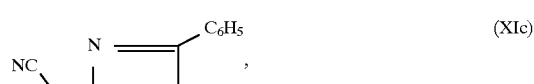 (XIc)

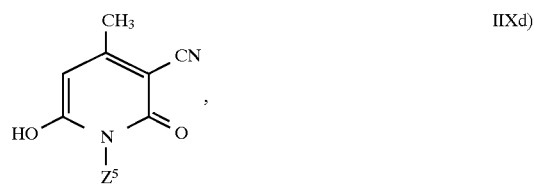 (IIXd)

 (XIe)

 (XIf)

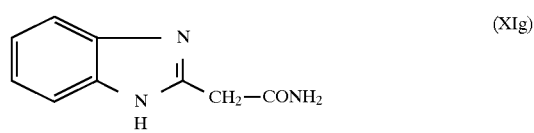 (XIg)

where $Z^1$ is cyano, nitro, $C_{1-4}$-alkanoyl, substituted or unsubstituted benzoyl, $C_{1-4}$-alkylsulfonyl, substituted or unsubstituted phenylsulfonyl, $C_1$–$C_4$-alkoxycarbonyl, $C_3$–$C_4$-alkenyloxycarbonyl, phenoxycarbonyl, carbamoyl, mono- or di($C_1$–$C_4$-alkyl)-carbamoyl, substituted or unsubstituted phenylcarbamoyl, substituted or unsubstituted phenyl, 2-benzothiazolyl, 2-benzimidazolyl, 5-phenyl-1,3,4-thiadiazol-2-yl or 2-hydroxy-3-quinoxalinyl, $Z^2$ is $C_{1-4}$-alkyl, $C_{1-4}$-alkoxy or $C_3$–$C_4$-alkenyloxy, $Z^3$ is $C_{1-4}$-alkoxycarbonyl, $C_3$–$C_4$-alkenyloxycarbonyl, phenylcarbamoyl or 2-benzimidazolyl, $Z^4$ is cyano, $C_{1-4}$-alkoxycarbonyl or $C_3$–$C_4$-alkenyloxycarbonyl, $Z^5$ is hydrogen or $C_{1-6}$-alkyl, $Z^6$ is hydrogen, $C_1$–$C_4$-alkyl or phenyl, and $Z^7$ is $C_{1-4}$-alkyl.

Attention is drawn to the radical derived from compounds of the formula XIa, XIb or XIc where $Z^1$ is cyano, $C_{1-4}$-alkanoyl, $C_{1-4}$-alkoxycarbonyl or $C_3$–$C_4$- alkenyloxycarbonyl, $Z^2$ is $C_1$–$C_4$-alkyl, $C_{1-4}$-alkoxy or $C_3$–$C_4$-alkenyloxy, $Z^3$ is $C_{1-4}$-alkoxycarbonyl or $C_3$–$C_4$-alkenyloxycarbonyl and $Z^4$ is cyano.

Particular attention is drawn to the radical derived from compounds of the formula XIa, XIb or XIc where $Z^1$ is cyano, $C_{1-4}$-alkoxycarbonyl or $C_3$–$C_4$-alkenyloxycarbonyl, $Z^2$ is $C_1$–$C_4$-alkoxy or $C_2$–$C_4$-alkenyloxy, $Z^3$ is $C_1$–$C_4$-alkoxycarbonyl or $C_3$–$C_4$-alkenyloxycarbonyl and $Z^4$ is cyano.

$R^{10}$, $R^{11}$ and $R^{12}$ may each also be for example heptyl, octyl, 2-ethylhexyl, nonyl, decyl, undecyl, dodecyl, 4,7-dioxanonyl, 4,8-dioxadecyl, 4,6-dioxaundecyl, 3,6,9-trioxaundecyl, 4,7,10-trioxaundecyl or 4,7,10-trioxadodecyl.

$R^1$, $R^2$, $R^{10}$, $R^{11}$ and $R^{12}$ may each also be for example 2-methoxyethyl, 2-ethoxyethyl, 2-propoxyethyl, 2-butoxyethyl, 2-isobutoxyethyl, 2- or 3-methoxypropyl, 1-methoxyprop-2-yl, 2- or 3-ethoxypropyl or 2- or 3-propoxypropyl, 3,6-dioxaheptyl, 3,6-dioxaoctyl, 4,7-dioxaoctyl, 2-hydroxyethyl, 3-hydroxypropyl, 4-hydroxybutyl, 2-cyclohexyloxyethyl, 2- or 3-cyclohexyloxypropyl, 2- or 4-cyclohexyloxybutyl, 2-phenoxyethyl, 2-phenoxypropyl, 3-phenoxypropyl, 4-phenoxybutyl, 2-methoxycarbonylethyl, 2-ethoxycarbonylethyl, 2- or 3-methoxycarbonylpropyl, 2- or 3-ethoxycarbonylpropyl, 2- or 3-butoxycarbonylpropyl, 4-methoxycarbonylbutyl, 4-ethoxycarbonylbutyl, 2-cyanoethyl, 2- or 3-cyanopropyl, 4-cyanobutyl, 2-cyclohexylethyl, 2- or 3-cyclohexylpropyl, benzyl, 1- or 2-phenylethyl, 2-acetyloxyethyl, 2-propionyloxyethyl, 2- or 3-acetyloxypropyl, prop-2-en-1-yl, 2-naethyl-prop-2-en-1-yl, but-2-en-1-yl or but-3-en-1-yl.

$R^{11}$ and $R^{12}$ combined with the nitrogen atom joining them together into a five- or six-membered saturated heterocyclic radical with or without further hetero atoms may be for example pyrrolidinyl, piperidinyl, morpholinyl, thiomorpholinyl, thiomorpholinyl S,S-dioxide, piperazinyl or N-($C_1$–$C_4$-alkyl)piperazinyl, such as N-methyl- or N-ethyl-piperazinyl.

$R^{10}$, $R^{11}$ and $R^{12}$ may each also be for example formyl, acetyl, propionyl, butyryl, isobutyryl, pentanoyl, hexanoyl, heptanoyl, octanoyl, 2-ethylhexanoyl, benzoyl, 2-, 3- or 4-methylbenzoyl, 2-, 3- or 4-methoxybenzoyl or 2-, 3- or 4-chlorobenzoyl.

Examples will now be mentioned of the radicals in the formulae Va to Vd.

$A^1$ and $A^7$ are each for example methyl, ethyl, propyl, isopropyl, butyl, isobutyl, sec-butyl, tert-butyl, pentyl, isopentyl, neopentyl, tert-pentyl, hexyl, 2-methylpentyl, heptyl, 1-ethylpentyl, octyl, 2-ethylhexyl or isooctyl.

$A^7$ may also be for example 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-propoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 2- or 4-butoxybutyl, 4,8-dioxadecyl, 3,6,9-trioxadecyl or 3,6,9-trioxaundecyl.

$A^1$ may also be for example phenyl, 2-, 3- or 4-methylphenyl, 2-, 3- or 4-ethylphenyl, 2-, 3- or 4-propylphenyl, 2-, 3- or 4-isopropylphenyl, 2-, 3- or 4-butylphenyl, 2,4-dimethylphenyl, 2-, 3- or 4-methoxyphenyl, 2-, 3- or 4-ethoxyphenyl, 2-, 3- or 4-isobutoxyphenyl or 2,4-dimethoxyphenyl.

$A^4$ is for example fluorine, chlorine, bromine, 2-, 3- or 4-methoxyphenyl or 2-, 3- or 4-ethoxyphenyl.

$G^2$ is for example methylsulfamoyl, ethylsulfamoyl, propylsulfamoyl, isopropylsulfamoyl, butylsulfamoyl, pentylsulfamoyl, hexylsulfamoyl, heptylsulfamoyl, octylsulfamoyl or 4-oxahexylsulfamoyl.

Examples will now be mentioned of the radicals in the formulae VIa to VIc.

$W^1$, $W^2$ and $W^4$ are each for example methyl, ethyl, propyl, isopropyl, butyl, isobutyl, sec-butyl or tert-butyl.

$W^4$ may also be for example pentyl, isopentyl, neopentyl, tert-pentyl, hexyl, 2-methylpentyl, heptyl, 1-ethylpentyl, octyl, 2-ethylhexyl or isooctyl.

Examples will now be mentioned of the radicals in the formulae VIIa and VIIb.

$Q^1$, $Q^5$, $Q^6$, $E^1$, $E^2$, $E^3$, $E^4$, $E^5$, $E^6$, $E^7$, $E^8$ and $E^{10}$ are each for example methyl, ethyl, propyl, isopropyl, butyl, isobutyl, sec-butyl or tert-butyl.

$Q^1$, $Q^6$, $E^1$, $E^2$, $E^3$, $E^4$, $E^5$, $E^6$, $E^7$ and $E^8$ may each also be for example pentyl, isopentyl, neopentyl, tert-pentyl, hexyl, 2-methylpentyl, heptyl, 1-ethylpentyl, octyl, 2-ethylhexyl or isooctyl.

$Q^1$, $E^2$ and $E^3$ may each also be for example nonyl, isononyl, decyl, isodecyl, undecyl or dodecyl.

$Q^1$ may also be for example tridecyl, isotridecyl, tetradecyl, pentadecyl, hexadecyl, heptadecyl, octadecyl, nonadecyl, eicosyl (the above designations isooctyl, isononyl, isodecyl and isotridecyl are trivial names derived from the oxo process alcohols—cf. Ullmann's Enzyklopädie der technischen Chemie, 4th Edition, Volume 7, pages 215 to 217, and Volume 11, pages 435 and 436), 2-methoxycarbonylethyl, benzyl, 1- or 2-phenylethyl, 3-benzyloxypropyl, phenoxymethyl, 6-phenoxy-4-oxahexyl, 8-phenoxy-4-oxaoctyl, 2-, 3- or 4-chlorophenyl or 2-, 3- or 4-carboxyphenyl.

$Q^1$ and $E^1$ may each also be for example 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-propoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 2- or 4-butoxybutyl or 4,8-dioxadecyl.

$Q^1$ may also be for example 3,6,9-trioxadecyl, 3,6,9-trioxaundecyl, 3,6,9-trioxadodecyl, 3,6,9,12-tetraoxatridecyl, 3,6,9,12-tetraoxatetradecyl, 11-oxahexadecyl, 13-butyl-11-oxaheptadecyl or 4,11-dioxapentadecyl.

$Q^3$, $E^2$, $E^3$ and $E^9$ are each for example methoxycarbonyl, ethoxycarbonyl, propoxycarbonyl, isopropoxycarbonyl, butoxycarbonyl, isobutoxycarbonyl or sec-butoxycarbonyl.

$E^9$ may also be for example mono- or dimethylcarbamoyl, mono- or diethylcarbonyl, mono- or dipropylcarbamoyl, mono- or diisopropylcarbonyl, mono- or dibutylcarbamoyl or N-methyl-N-butylcarbamoyl.

$E^7$, $E^8$ and $E^{10}$ may each also be for example methoxy, ethoxy, propoxy, isopropoxy, butoxy, isobutoxy or sec-butoxy.

$E^{10}$ may also be for example methylthio, ethylthio, propylthio, isopropylthio, butylthio, isobutylthio or sec-butylthio.

$Q^1$, $E^2$, $E^3$ and $E^{10}$ may each also be for example phenyl, 2-, 3- or 4-methylphenyl, 2-, 3- or 4-ethylphenyl, 2-, 3- or 4-propylphenyl, 2-, 3- or 4-isopropylphenyl, 2-, 3- or 4-butylphenyl, 2,4-dimethylphenyl, 2-, 3- or 4-methoxyphenyl, 2-, 3- or 4-ethoxyphenyl, 2-, 3- or 4-isobutoxyphenyl or 2,4-dimethoxyphenyl.

$Q^1$, $E^2$ and $E^3$ may each also be for example 2-hydroxyethyl, 2- or 3-hydroxypropyl, 2-cyanoethyl, 2- or 3-cyanopropyl, 2-acetyloxyethyl, 2- or 3-acetyloxypropyl, 2-isobutyryloxyethyl, 2- or 3-isobutyryloxypropyl, 2-methoxycarbonylethyl, 2- or 3-methoxycarbonylpropyl, 2-ethoxycarbonylethyl, 2- or 3-ethoxycarbonylpropyl, 2-methoxycarbonyloxyethyl, 2- or 3-methoxycarbonyloxypropyl, 2-ethoxycarbonyloxyethyl, 2- or 3-ethoxycarbonyloxypropyl, 2-butoxycarbonyloxyethyl, 2- or 3-butoxycarbonyloxypropyl, 2-(2-phenylethoxycarbonyloxy)ethyl, 2- or 3-(2-phenylethoxycarbonyloxy)propyl, 2-(2-ethoxyethoxycarbonyloxy) ethyl or 2- or 3-(2-ethoxyethoxycarbonyloxy)propyl.

$E^2$ and $E^3$ may each also be for example pyridyl, 2-, 3- or 4-methylpyridyl, 2-, 3- or 4-methoxypyridyl, formyl, acetyl, propionyl, butyryl, isobutyryl, pentanoyl, hexanoyl, heptanoyl, octanoyl, 2-ethylhexanoyl, methylsulfonyl, ethylsulfonyl, propylsulfonyl, isopropylsulfonyl, butylsulfonyl, cyclopentylsulfonyl, cyclohexylsulfonyl, cycloheptylsulfonyl, phenylsulfonyl, tolylsulfonyl, pyridylsulfonyl, benzoyl, 2-, 3- or 4-methylbenzoyl, 2-, 3- or 4-methoxybenzoyl, thien-2-ylcarbonyl, thien-3-ylcarbonyl, cyclopentyl, cyclohexyl or cycloheptyl.

$E^2$ and $E^3$ or $E^4$ and $E^5$ combined with the nitrogen atom joining them together into a five- or six-membered saturated heterocyclic radical with or without further hetero atoms may be for example pyrrrolidinyl, piperidinyl, morpholinyl, piperazinyl or N-($C_1$–$C_4$-alkyl)piperazinyl.

Particularly suitable monoazo dyes are those of the formula IIa where $D^1$ is a radical of the formula IIIb.

Particularly suitable monoazo dyes further include those of the formula Ia where $K^1$ is a radical of the formula IVa or IVd.

Particular attention is drawn to monoazo dyes of the formula IIb

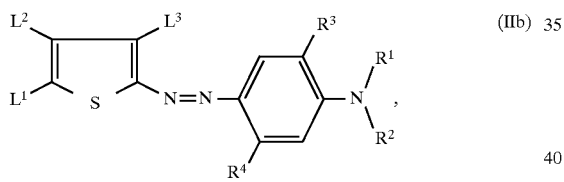

(IIb)

where $L^1$ is nitro, cyano, $C_1$–C6-alkanoyl or a radical of the formula —CH=T where T is a radical of an acidic—CH compound, $L^2$ is $C_1$–$C_6$-alkyl, halogen, unsubstituted or phenyl- or $C_1$–$C_4$-alkoxy-substituted $C_1$–$C_6$-alkoxy, $L^3$ is cyano, $C_1$–$C_4$-alkoxycarbonyl or nitro, $R^1$ and $R^2$ are independently of each other hydrogen, substituted or unsubstituted $C_1$–$C_6$-alkyl with or without interruption by 1 or 2 oxygen atoms in ether function, or $C_3$–$C_6$-alkenyl, $R^3$ is hydrogen, $C_1$–$C_6$-alkyl or $C_1$–$C_6$-alkoxy, and $R^4$ is hydrogen, $C_1$–C6-alkyl, $C_1$–$C_6$-alkoxy, $C_1$–$C_6$-alkylsulfonylamino or substituted or unsubstituted $C_1$–$C_6$-alkanoylamino.

Particularly suitable methine or azamethine dyes conform to the formula VIIa or VIIb where $R^5$ is methyl.

Particularly suitable methine or azamethine dyes further conform to the formula VIIa or VIIb where $Q^5$ is cyano.

Particularly suitable methine or azamethine dyes further conform to the formula VIIa or VIIb where $Q^4$ is oxygen.

Particularly suitable azamethine dyes further conform to the formula VII where X is nitrogen.

Particularly suitable methine dyes further conform to the formula VII where X is CH.

Particularly suitable methine or azamethine dyes further conform to the formula VIIa or VIIb where $Q^2$ is a radical of the pyrrole, thiazole or thiophene series.

Particularly suitable methine or azamethine dyes further conform to the formula VIIa where $Q^1$ is $C_1$–$1_2$-alkyl with or without substitution by $C_{1-6}$-alkanoyloxy, $C_{1-8}$-alkoxycarbonyl, whose alkyl chain may be interrupted by 1 or 2 oxygen atoms in ether function, phenyl or $C_1$–$C_4$-alkylphenyl and with or without interruption by 1 or 2 oxygen atoms in ether function.

Particularly suitable methine or azamethine dyes further conform to the formula VIIb where $Q^6$ is a radical of the formula $NE^2E^3$ where $E^2$ and $E^3$ are independently of each other substituted or unsubstituted $C_1$–$C_{12}$-alkanoyl or substituted or unsubstituted benzoyl or else $E^2$ is hydrogen.

Particular attention is drawn to methine or azamethine dyes of the formula VIIb where $Q^6$ is a radical of the formula $NE^2E^3$ where $E^2$ and $E^3$ are independently of each other $C_1$–$C_8$-alkanoyl or benzoyl or else $E^2$ is hydrogen.

Particular attention is further drawn to methine or azamethine dyes of the formula VIIa where $Q^1$ is alkyl, alkoxyalkyl, alkanoyloxyalkyl or alkoxycarbonylalkyl, which radicals have up to 12 carbon atoms each, unsubstituted or methyl-substituted benzyl or unsubstituted or methyl-substituted phenyl.

Particular attention is further drawn to methine or azamethine dyes of the formula VIIa or VIIb where $Q^2$ is a radical of the abovementioned formula VIIIa or VIIIc, especially VIIIa, where $E^4$ and $E^5$ are independently of each other alkyl, alkoxyalkyl, alkanoyloxyalkyl or alkoxycarbonylalkyl, which radicals have up to 12 carbon atoms each, hydrogen, unsubstituted or methyl-substituted benzyl or unsubstituted or methyl-substituted phenyl, $E^6$ is hydrogen, $C_1$–$C_4$-alkyl, unsubstituted or $C_f$–$C_4$-alkyl- or $C_{1-4}$-alkoxy-substituted phenyl, benzyl or thienyl, $E^9$ is cyano, $E^{10}$ is halogen, hydrogen, $C_1$–$C_4$-alkyl, $C_{1-4}$-alkoxy, $C_{1-4}$-alkylthio, unsubstituted or $C_1$–$C_4$-alkyl-substituted phenyl or thienyl, and n is 0.

Particularly suitable quinophthalone dyes conform to the formula IX where $G^4$ is hydrogen or bromine.

The monoazo dyes of the formula IIa are known per se and have been described in large numbers, for example in K. Venkataraman, The Chemistry of Synthetic Dyes, Vol. VI, Academic Press, New York, London, 1972, or EP-A-201 896.

The anthraquinone dyes of the formula Va to Vc are likewise known per se and described for example in D. R. Waring, G. Hallas, The Chemistry and Application of Dyes, pages 107 to 118, Plenum Press, New York, London, 1990.

The coumarin dyes of the formula VIa to VIc are likewise known per se and described for example in Ullmann's Enzyklopadie der technischen Chemie, 4th Edition, Volume 17, page 469.

The methine or azamethine dyes of the formula VIIa and VIIb are likewise known per se and described for example in U.S. Pat. No. 5,079,365 and WO-A-9219684.

The quinophthalone dyes of the formula IX are likewise known per se and described for example in EP-83 553.

The nitro dye of the formula X is commonly referred to as C. I. Disperse Yellow 42 (10 338).

Suitable dyes with carboxyl and/or sulfo groups will now be more particularly described. These dyes are in particular azo or anthraquinone dyes.

Of azo dyes, it is monoazo or disazo dyes, which may also be metallized, which are notable, in particular those which have from 1 to 6 carboxyl and/or sulfo groups.

Important azo dyes are for example those whose diazo component is derived from an aniline or aminonaphthalene.

Important azo dyes further include for example those whose coupling component is derived from an aniline, naphthalene, pyrazolone, aminopyrazole, diaminopyridine, pyridone or acylacetarylide.

Specific examples include metal-free or metallized (metal complexes) azo dyes of the phenyl-azo-naphthalene, phenyl-azo-1-phenylpyrazol-5-one, phenyl-azo benzene, naphthyl-azo-benzene, phenyl-azo-aminonaphthalene, naphthyl-azo-naphthalene, naphthyl-azo-1-phenylpyrazol-5-one, phenyl-azo-pyridone, phenyl-azo-aminopyridine, naphthyl-azo-pyridone, naphthyl-azo-aminopyridine or stilbyl-azo-benzene series.

The azo dyes may additionally contain a reactive group, for example the radical of the formula

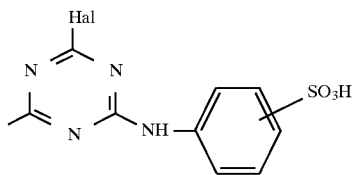

which is linked either to the diazo component or to the coupling component via a substituted or unsubstituted amino group.

Of particular importance are azo dyes of the formula IIc $$D^2-N=N-K^2 \qquad (IIc),$$

where $D^2$ is a radical of the formula

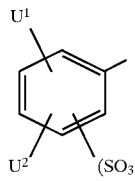 (XIIa)

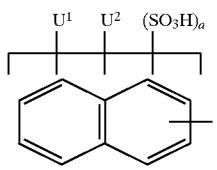 (XIIb)

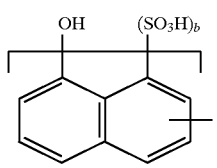 (XIIc)

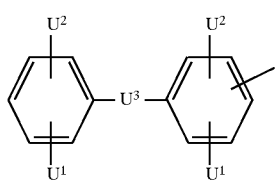 (XIId)

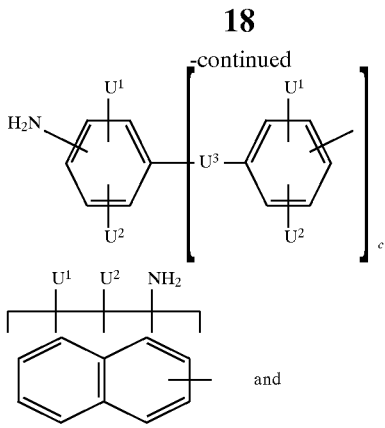 (XIIe)

(XIIf)

and $K^2$ is a radical of the formula

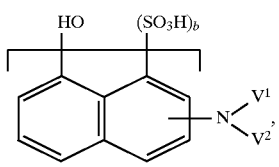 (XIIIa)

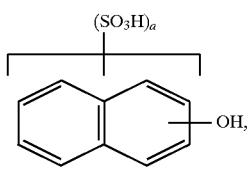 (XIIIb)

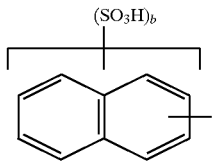 (XIIIc)

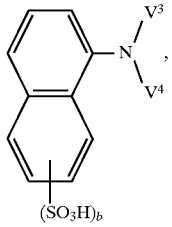 (XIIId)

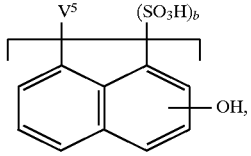 (XIIIe)

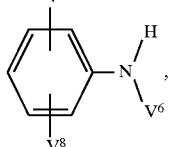 (XIIIf)

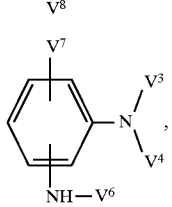 (XIIIg)

-continued

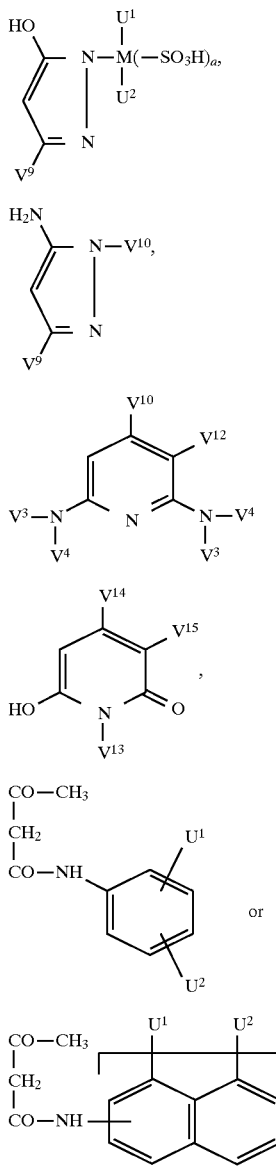

where
a is 0, 1, 2 or 3,
b is 0, 1 or 2,
c is 0 or 1,
$U^1$ is hydrogen, methyl, ethyl, methoxy, ethoxy, acetyl, cyano, carboxyl, hydroxysulfonyl, $C_1$–$C_4$-alkoxycarbonyl, hydroxyl, carbamoyl, $C_{1-4}$-monoalkylcarbamoyl or -dialkylcarbamoyl, fluorine, chlorine, bromine or trifluoromethyl,
$U^2$ is hydrogen, methyl, ethyl, methoxy, ethoxy, cyano, carboxyl, hydroxysulfonyl, acetylamino, $C_{1-4}$-alkoxycarbonyl, carbamoyl, $C_1$–$C_4$-monoalkylcarbamoyl or -dialkylcarbamoyl, fluorine, chlorine, nitro, sulfamoyl, $C_{1-4}$-monoalkylsulfamoyl or -dialkylsulfamoyl, $C_{1-4}$-alkylsulfonyl, phenylsulfonyl or phenoxy, and
$U^3$ is a direct bond, oxygen, sulfur or the group —NHCO—, —NH—CO—NH—, —CONH—, —CO—, —NHSO$_2$—, —SO$_2$NH—, —SO$_2$—, —CH=CH—, —CH$_2$—CH$_2$—, —CH$_2$—, —NH—, or —N=N—, $V^1$ is hydrogen or $C_1$–$C_4$-alkyl,
$V^2$ is hydrogen, $C_{1-4}$-alkyl or phenyl which may be substituted by $C_1$–$C_5$-alkyl, $C_1$–$C_4$-alkoxy, chlorine, bromine or hydroxysulfonyl,
$V^3$ is hydrogen or $C_1$–$C_4$-alkyl which may be substituted by hydroxyl, cyano, carboxyl, hydroxysulfonyl, sulfato, methoxycarbonyl, ethoxycarbonyl or acetoxy,
$V^4$ is hydrogen, $C_{1-4}$-alkyl which may be hydroxyl-, cyano-, carboxyl-, hydroxysulfonyl-, sulfato-, methoxycarbonyl-, ethoxycarbonyl- or acetoxy-substituted, benzyl or phenyl which may be substituted by $C_1$–$C_4$-alkyl, $C_{1-4}$-alkoxy, chlorine or hydroxysulfonyl,
$V^5$ is $C_1$–$C_6$-alkylureido, phenylureido, which may be chlorine-, methyl-, methoxy-, nitro-, hydroxysulfonyl- or carboxyl-substituted, $C_{1-6}$-alkanoylamino, which may be hydroxysulfonyl- or chlorine-substituted, cyclohexanoylamino, benzoylamino, which may be chlorine-, methyl-, methoxy-, nitro-, hydroxylsulfonyl- or carboxyl-substituted, or hydroxyl,
$V^6$ is hydrogen, $C_{1-6}$-alkyl, which may be phenyl-, $C_1$–$C_4$-alkoxy-, hydroxyl-, phenoxy- or $C_1$–$C_4$-alkanoyloxy-substituted, $C_5$–$C_7$-cycloalkyl, hydroxysulfonylphenyl, $C_1$–$C_4$-alkanoyl, carbamoyl, $C_1$–$C_4$-monoalkylcarbamoyl or -dialkylcarbamoyl, phenylcarbamoyl or cyclohexylcarbamoyl,
$V^7$ is methoxy, ethoxy, chlorine, bromine, hydroxysulfonyl, acetylamino, amino, ureido, methylsulfonylamino, ethylsulfonylamino, dimethylaminosulfonylamino, methylamino, ethylamino, dimethylamino or diethylamino,
V8 is hydrogen, methyl, ethyl, methoxy, ethoxy, hydroxysulfonyl, chlorine or bromine,
M is the radical of a benzene or naphthalene ring,
$V^9$ is methyl, carboxyl, $C_1$–$C_4$-alkoxycarbonyl or phenyl,
$V^{10}$ $C_1$–$C_4$-alkyl, cyclohexyl, benzyl or phenyl which may be substituted by fluorine, chlorine, bromine, methyl, methoxy, nitro, hydroxysulfonyl, carboxyl, acetyl, acetylamino, methylsulfonyl, sulfamoyl or carbamoyl,
$V^{11}$ is hydrogen or $C_l$–$C_4$-alkyl which may be substituted by methoxy, ethoxy or cyano,
$V^{12}$ is hydrogen, methyl, hydroxysulfonylmethyl, hydroxysulfonyl, cyano or carbamoyl,
$V^{13}$ is hydrogen, $C_1$–$C_4$-alkyl which may be phenyl-, hydroxysulfonylphenyl-, hydroxyl-, amino-, methoxy-, ethoxy-, carboxyl-, hydroxysulfonyl-, acetylamino-, benzoylamino- or cyano-substituted, cyclohexyl, phenyl which may be carboxyl-, hydroxysulfonyl-, benzoylamino-, acetylamino-, methyl-, methoxy-, cyano- or chlorine-substituted, or amino which is substituted by phenyl, $C_1$–$C_4$-alkyl, acetyl or benzoyl,
$V^{14}$ is $C_{1-4}$-alkyl, phenyl, hydroxyl, cyano, acetyl, benzoyl, carboxyl, methoxycarbonyl, carbamoyl or hydroxysulfonylmethyl and
$V^{15}$ is hydrogen, chlorine, bromine, acetylamino, amino, nitro, hydroxysulfonyl, sulfamoyl, methylsulfonyl, phenylsulfonyl, carboxyl, methoxycarbonyl, acetyl, benzoyl, carbamoyl, cyano or hydroxysulfonylmethyl, with the proviso that at least one carboxyl and/or sulfo group is present in the molecule.

Aromatic amines which are suitable for use as diazo components and which are derived from the formula XIIa, XIIb, XIIc or XIId are for example aniline, 2-methoxyaniline, 2-methylaniline, 4-chloro-2- aminoanisole, 4-methylaniline, 4-methoxyaniline, 2-methoxy-5-methylaniline, 2,5-dimethoxyaniline, 2,5-dimethylaniline, 2,4-dimethylaniline, 2,5-diethoxyaniline, 2-chloroaniline, 3-chloroaniline, 4-chloroaniline, 2,5-dichloroaniline, 4-chloro-2-nitroaniline, 4-chloro-2-methylaniline, 3-chloro-2-methylaniline, 4-chloro-2-aminotoluene, 4-phenylsulfonylaniline, 2-ethoxy-1-naphthylamine, 1-naphthylamine, 2-naphthylamine, 4-methylsulfonylaniline, 2,4-dichloroaniline-5-carboxylic acid, 2-aminobenzoic acid, 4-aminobenzoic acid, 3-aminobenzoic acid, 3-chloroaniline-6-carboxylic acid, aniline-2- or -3- or -4-sulfonic acid, aniline-2,5-disulfonic acid, aniline-2,4-disulfonic acid, aniline-3,5-disulfonic acid, 2-aminotoluene-4-sulfonic acid, 2-aminoanisole-5-sulfonic acid, 2-ethoxyaniline-5-sulfonic acid, 2-ethoxyaniline-4-sulfonic acid, 4-hydroxy-sulfonyl-2-aminobenzoic acid, 2,5-dimethoxyaniline-4-sulfonic acid, 2,4-dimethoxyaniline-5-sulfonic acid, 2-methoxy-5-methylaniline-4-sulfonic acid, 4-aminoanisole-3-sulfonic acid, 4-aminotoluene-3-sulfonic acid, 2-aminotoluene-5-sulfonic acid, 2-chloroaniline-4-sulfonic acid, 2-chloroaniline-5-sulfonic acid, 2-bromo-aniline-4-sulfonic acid, 2,6-dichloroaniline-4-sulfonic acid, 2,6-dimethylaniline-3- or -4-sulfonic acid, 3-acetylamino-aniline-6-sulfonic acid, 4-acetylaminoaniline-2-sulfonic acid, 1-aminonaphthalene-3-sulfonic acid, 1-aminonaphthalene-4-sulfonic acid, 1-aminonaphthalene-5-sulfonic acid, 1-aminonaphthalene-6-sulfonic acid, 1-aminonaphthalene-7-sulfonic acid, 1-aminonaphthalene-3,7-disulfonic acid, 1-aminonaphthalene-3,6,8-trisulfonic acid, 1-aminonaphthalene-4,6,8-trisulfonic acid, 2-naphthylamine-5-sulfonic acid, or -6- or -8-sulfonic acid, 2-aminonaphthalen-3,6,8-trisulfonic acid, 2-aminonaphthalene-6,8-disulfonic acid, 2-aminonaphthalene-1,6-disulfonic acid, 2-aminonaphthalene-1-sulfonic acid, 2-aminonaphthalene-1,5-disulfonic acid, 2-aminonaphthalene-3,6-disulfonic acid, 2-aminonaphthalene-4,8-disulfonic acid, 2-aminophenol-4-sulfonic acid, 2-aminophenol-5-sulfonic acid, 3-aminophenol-6-sulfonic acid, 1-hydroxy-2-aminonaphthalene-5,8- or -4,6-disulfonic acid, 4-aminodiphenylamine, 4-amino-4'-methoxy-diphenylamine, 4-amino-4'-methoxydiphenylamine-3-sulfonic acid, 4-(2'-methylphenylazo)-2-methylaniline, 4-aminoazobenzene, 4'-nitrophenylazo-1-aminonaphthalene, 4-(6'-hydroxysulfonylnaphthylazo)-1-aminonaphthalene, 4-(2',5'-dihydroxysulfonylphenylazo)-1-aminonaphthalene, 4'-amino-3'-methyl-3-nitro-benzophenone, 4-aminobenzophenone, 4-(4'-aminophenylazo)benzenesulfonic acid, 4-(4'-amino-2'-methoxyphenylazo)benzenesulfonic acid, 4-(4'-amino-3'-methoxyphenylazo)benzenesulfonic acid and 2-ethoxy-1-naphthylamine-6-sulfonic acid.

Aromatic diamines which are suitable for use as tetrazo components and which are derived from the formula XIIe or XIIf are for example 1,3-diaminobenzene, 1,3-diaminobenzene-4-sulfonic acid, 1,4-diaminobenzene, 1,4-diaminobenzene-2-sulfonic acid, 1,4-diamino-2-methylbenzene, 1,4-diamino-2-methoxybenzene, 1,3-diamino-4-methylbenzene, 1,3-diaminobenzene-5-sulfonic acid, 1,3-diamino-5-methylbenzene, 1,6-diaminonaphthalene-4-sulfonic acid, 2,6-diaminonaphthalene-4,8-disulfonic acid, 3,3'-diaminodiphenyl sulfone, 4,4'-diaminodiphenyl sulfone, 4,4'-diaminostilbene-2,2'-disulfonic acid, 2,7'-diaminodiphenyl sulfone, 2,7'-diaminodiphenyl sulfone-4,5-disulfonic acid, 4,4'-diaminobenzophenone, 4,4'-diamino-3,3'-dinitrobenzophenone, 3,3'-diamino-4,4'-dichlorobenzophenone, 4,4'- or 3,3'-diaminobiphenyl, 4,4'-diamino-3,3'-dichlorobiphenyl, 4,4'-diamino-3,3'-dimethoxy- or -3,3'-dimethyl- or -2,2'-dimethyl- or -2,2'-dichloro- or -3,3'-diethoxybiphenyl, 4,4'-diamino-3,3'-dimethyl-6,6'-dinitrobiphenyl, 4,4'-diaminobiphenyl-2,2'- or -3,3'-disulfonic acid, 4,4'-diamino-3,3'-dimethyl- or -3,3'-dimethoxy- or -2,2'-dimethoxybiphenyl-6,6'-disulfonic acid, 4,4'-diamino-2,2', 5,5'-tetrachlorobiphenyl, 4,4'-diamino-3, 3'-dinitrobiphenyl, 4,4'-diamino-2,2'-dichloro-5,5'-dimethoxybiphenyl, 4,4'-diaminobiphenyl-2,2'- or -3,3'-dicarboxylic acid, 4,4'-diamino-3,3'-dimethylbiphenyl-5,5'-disulfonic acid, 4,4'-diamino-2-nitrobiphenyl, 4,4'-diamino-3-ethoxy- or -3-hydroxysulfonylbiphenyl, 4,4'-diamino-3,3'-dimethylbiphenyl-5-sulfonic acid, 4,4'-diaminodiphenylmethane, 4,4'-diamino-3,3'-dimethyldiphenylmethane, 4,4'-diamino-2,2', 3,3'-tetramethyldiphenylmethane, 4,4'-diaminodiphenylethane, 4,4'-diaminostilbene or 4,4'-diaminodiphenylmethane-3,3'-dicarboxylic acid.

$K^2$ is for example an aniline, such as o- or m-toluidine, o- or m-anisidine, cresidine, 2,5-dimethylaniline, 2,5-dimethoxyaniline, m-aminoacetanilide, 3-amino-4-methoxyacetanilide, 3-amino-4-methylacetanilide, m-aminophenylurea, N-methylaniline, N-methyl-m-toluidine, N-ethylaniline, N-ethyl-m-toluidine, N-(2-hydroxyethyl)aniline or N-(2-hydroxyethyl)-m-toluidine.

$K^2$ may also be for example a naphtholsulfonic acid, such as 1-naphthol-3-sulfonic acid, 1-naphthol-4-sulfonic acid, 1-naphthol-5-sulfonic acid, 1-naphthol-8-sulfonic acid, 1-naphthol-3,6-disulfonic acid, 1-naphthol-3,8-disulfonic acid, 2-naphthol-5-sulfonic acid, 2-naphthol-6-sulfonic acid, 2-naphthol-7-sulfonic acid, 2-naphthol-8-sulfonic acid, 2-naphthol-3,6-disulfonic acid, 2-naphthol-6,8-disulfonic acid, 2-naphthol-3,6,8-trisulfonic acid, 1,8-dihydroxynaphthalene-3,6-disulfonic acid, 2,6-dihydroxynaphthalene-8-sulfonic acid or 2,8-dihydroxynaphthalene-6-sulfonic acid.

$K^2$ may also be for example a naphthylamine, such as 1-naphthylamine, N-phenyl-1-naphthylamine, N-ethyl-1-naphthylamine, N-phenyl-2-naphthylamine, 1-naphthol, 2-naphthol, 1,5-dihydroxynaphthalene, 1,6-dihydroxynaphthalene, 1,7-dihydroxynaphthalene or 2,7-dihydroxynaphthalene.

$K^2$ may also be for example an aminonaphthalenesulfonic acid, such as 1-naphthylamine-6-sulfonic acid, 1-naphthylamine-7-sulfonic acid, 1-naphthylamine-8-sulfonic acid, 2-naphthylamine-3,6-disulfonic acid, 2-naphthylamine-5,7-disulfonic acid or 2-naphthylamine-6,8-disulfonic acid.

$K^2$ may also be for example an aminonaphtholsulfonic acid, such as 1-amino-5-hydroxynaphthalene-7-sulfonic acid, 1-amino-8-hydroxynaphthalene-4-sulfonic acid, 1-amino-8-hydroxynaphthalene-2,4-disulfonic acid, 1-amino-8-hydroxynaphthalene-3,6-disulfonic acid, 1-amino-8-hydroxynaphthalene-4,6-disulfonic acid, 2-amino-5-hydroxynaphthalene-7-sulfonic acid, 2-amino-8-hydroxynaphthalene-6-sulfonic acid, 2-amino-8-hydroxynaphthalene-3,6-disulfonic acid, 2-amino-5-hydroxynaphthalene-1,7-disulfonic acid, 1-acetylamino-8-hydroxynaphthalene-3,6-disulfonic acid, 1-benzoylamino-8-hydroxynaphthalene-3,6-disulfonic acid, 1-acetylamino-8-hydroxynaphthalene-4,6-disulfonic acid, 1-benzoylamino-8-hydroxynaphthalene-4,6-disulfonic acid, 1-acetylamino-5-hydroxynaphthalene-7-sulfonic acid, 2-methylamino-8-hydroxynaphthalene-6-sulfonic acid, 2-methylamino-8-hydroxynaphthalene-6-sulfonic acid or 2-(3'- or 4'-hydroxysulfonylphenyl)amino-8-hydroxynaphthalene-6-sulfonic acid.

$K^2$ may also be for example a pyrazolone, such as 1-phenyl-, 1-(2'-chlorophenyl)-, 1-(2'-methoxyphenyl)-, 1-(2'-methylphenyl)-, 1-(1',5'-dichlorophenyl)-, 1-(2',6'-dichlorophenyl)-, 1-(2'-methyl-6'-chlorophenyl)-, 1-(2'-methoxy-5'-methylphenyl)-, 1-(2'-methoxy-5'-hydroxysulfonylphenyl)-, 1-(2',5'-dihydroxysulfonylphenyl)-, 1-(2'-carboxyphenyl)-, 1-(3'-hydroxysulfonylphenyl)-, 1-(4'-hydroxysulfonylphenyl)- or 1-(3'-sulfamoylphenyl)-3-carboxylpyrazol-5-one, 1-(3'- or 4'-hydroxysulfonylphenyl)-, 1-(2'-chloro-4'- or -5'-hydroxysulfonylphenyl)-1-(2'-methyl-4'-hydroxysulfonylphenyl)-, 1-(2',5'-dichlorophenyl)-1-(4',8'-dihydroxysulfonyl-1-naphthyl)-, 1-(6'-hydroxysulfonyl-1-naphthyl)-3-methyl-pyrazol-5-one, ethyl 1-phenylpyrazol-5-one-3-carboxylate, ethyl pyrazol-5-one-3-carboxylate or pyrazol-5-one-3-carboxylic acid.

$K^2$ may also be for example an aminopyrazole, such as 1-methyl-, 1-ethyl-, 1-propyl-, 1-butyl-, 1-cyclohexyl-, 1-benzyl- or 1-phenyl-5-aminopyrazole, 1-(4-chlorophenyl)- or 1-(4'-methylphenyl)-5-aminopyrazole and 1-phenyl-3-methyl-5-aminopyrazole.

$K^2$ may also be for example a pyridone, such as 1-ethyl-2-hydroxy-4-methyl-5-carbamoylpyrid-6-one, 1-(2'-hydroxyethyl)-2-hydroxy-4-methyl-5-carbamoylpyrid-6-one, 1-phenyl-2-hydroxy-4-methyl-5-carbamoylpyrid-6-one, 1-ethyl-2-hydroxy-4-methyl-5-cyanopyrid-6-one, 1-ethyl-2-hydroxy-4-methyl-5-hydroxysulfonylmethylpyrid-6-one, 1-methyl-2-hydroxy-4-methyl-5-cyanopyrid-6-one, 1-methyl-2-hydroxy-5-acetylpyrid-6-one, 1,4-dimethyl-2-hydroxy-5-cyanopyrid-6-one, 1,4-dimethyl-5-carbamoylpyrid-6-one, 2,6-dihydroxy-4-ethyl-5-cyanopyridine, 2,6-dihydroxy-4-ethyl-5-carbamoylpyridine, 1-ethyl-2-hydroxy-4-methyl-5-hydroxysulfonylmethylpyrid-6-one, 1-methyl-2-hydroxy-4-methyl-5-methylsulfonylpyrid-6-one or 1-carboxymethyl-2-hydroxy-4-ethyl-5-phenylsulfonylpyrid-6-one.

Instead of the azo dyes of the formula IIc the process of the invention may also employ the corresponding metal complex dyes.

Suitable complexing metals here are in particular copper, cobalt, chromium, nickel and iron of which copper, cobalt or chromium are preferred. Of particular suitability are the symmetrical or asymmetrical 1:1 or 1:2 chromium complexes. The metallized groups are each preferably ortho to the azo group, for example in the form of o,o-dihydroxy-, o-hydroxy-o'-carboxy-, o-carboxy-o'-amino- or o-hydroxy-o'-amino-azo-groups.

Preference is given to dyes of formula IIc where $D^2$ is a radical of the formula XIIa, XIIb, XIIc, XIId, XIIe or XIIf where $U^1$ is hydrogen, methyl, methoxy, carboxyl, hydroxysulfonyl, hydroxyl or chlorine, $U^2$ is hydrogen, methyl, methoxy, carboxyl, hydroxysulfonyl, acetylamino or chlorine and $U^3$ is —CO—, —SO$_2$—, —CH=CH—, —CH$_2$—CH$_2$—, —CH$_2$— or —N=N—.

Preference is further given to dyes of formula IIc where the radical $K^2$ is derived from coupling components which have sulfo and/or carboxyl groups and which couple ortho or para to a hydroxyl and/or amino group. Specific examples of such coupling components are 2-acetylamino-5-hydroxynaphthalene-7-sulfonic acid, 2-acetylamino-8-hydroxynaphthalene-6-sulfonic acid, 1-acetylamino-8-hydroxynaphthalene-3, 6-disulfonic acid, 1-benzoylamino-8-hydroxynapthalene-3,6-disulfonic acid, 1-acetylamino-8-hydroxynaphthalene-4,6-disulfonic acid or 1-benzoylamino-8-hydroxynaphthalene-4,6-disulfonic acid.

Preference is given to azo dyes of the formula XIV

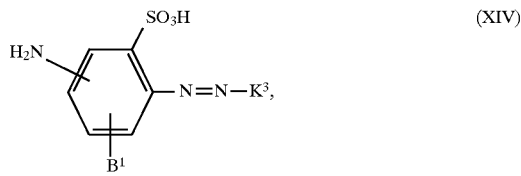

where $B^1$ is hydrogen, $C_1$–$C_4$-alkyl, $C_1$–$C_4$-alkoxy, chlorine or hydroxysulfonyl and $K^3$ is the radical of a coupling component of the naphthalene, pyrazolone or pyridone series.

Particular preference is further given to azo dyes of the formula XV

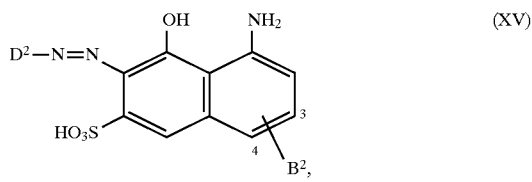

where $D^2$ is as defined above and $B^2$ is hydroxysulfonyl in ring position 3 or 4.

Particular preference is further given to azo dyes of the formula XVI

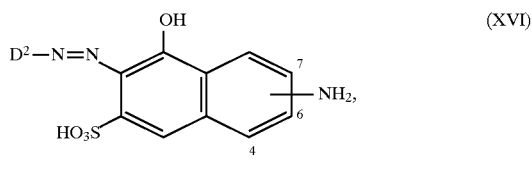

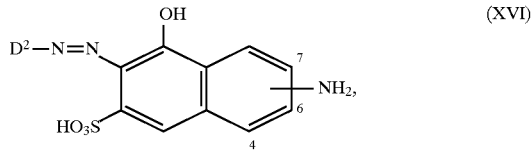

where $D^2$ is as defined above and the amino group is in ring position 6 or 7.

Useful compounds further include those of the formula XVII

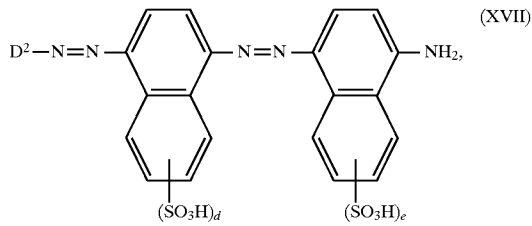

where $D^2$ is as defined above and d and e independently of each other are 0, 1 or 2.

Useful compounds further include those of the formula XVIII

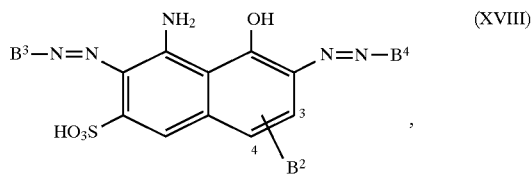

where $B^2$ is as defined above and one of $B^3$ and $B^4$ is $D^2$, which has the abovementioned meaning, and the other is 3-amino-6-hydroxysulfonylphenyl or else both $B^3$ and $B^4$ are 3-amino-6-hydroxysulfonylphenyl.

Also of particular suitability is the symmetrical 1:2 chromium complex dye based on the azo dye 1-(2-hydroxy-4-hydroxysulfonyl-6-nitronaphth-1-ylazo)-2-hydroxynaphthalene.

The process of the present invention may also employ acid anthraquinone dyes. Such anthraquinones are known per se and described for example in K. Venkataraman, The Chemistry of Synthetic Dyes, Vol. II, Academic Press, New York, 1952.

Preference is given to acid anthraquinone dyes of the series of the 1,4-diaminoanthraquinones. They conform for example to the formula XVIII

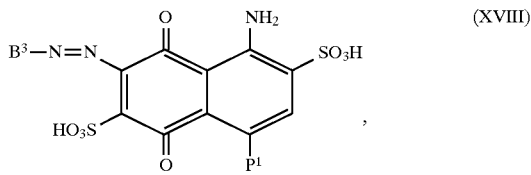

(XVIII)

where $P^1$ is amino or a radical of formula

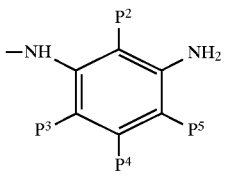

where $P^2$ and $P^3$ are independently of each other hydrogen or methyl and one of $P^4$ and $P^5$ is hydrogen or methyl and the other is hydroxysulfonyl.

The second step of the process of the present invention, step (B), comprises admixing the mixture prepared in step (A) with melamine and if desired with further phenol, substituted melamine I and formaldehyde or formaldehyde-donating compounds, the amounts being chosen so that the molar ratio of melamines (melamine and (a)) to (b) is within the range from 1:1.15 to 1:4.5, preferably from 1:1.8 to 1:3.0, the pigment or dye is present in an amount within the range from 0.01 to 5, preferably from 0.1 to 2,% by weight, based on melamine and (a) and (b), and the phenol being present in an amount within the range from 0 to 5, preferably from 0.2 to 2, mol %, based on melamine and (a) and (b).

When fibers are to be produced, it is particularly preferable for the amount of substituted melamine I (component (a)) to be within the range from 1 to 50, preferably from 5 to 15, very particularly preferably from 7 to 12, mol %, based on the sum total of melamine and substituted melamine I, and preferably for from 0.1 to 9.5, particularly preferably from 1 to 5, mol %, based on melamine and (a) and (b), of one of the above-recited phenols or mixtures thereof to be used.

The entire mixture is then condensed in a conventional manner as described for example in EP-A 523 485, EP-A 355 760 or Houben-Weyl, vol. 14/2, Georg Thieme Verlag, Stuttgart, 1963, pp. 357.

The reaction temperatures are generally chosen to be within the range from 20° to 150° C., preferably from 40° to 140° C.

The reaction pressure is generally not critical. It is generally within the range from 100 to 500 kPa, preferably 100 to 300kPa.

The reaction can be carried out with or without solvent. When an aqueous formaldehyde solution is used, generally no solvent is added. When formaldehyde bound in solid form is used, the solvent used is normally water and the amount used generally ranges from 5 to 40, preferably from 15 to 25,% by weight, based on the total amount of monomers used.

Furthermore, the polycondensation is generally carried out in a pH range above 7. Preference is given to the pH range from 7.5 to 10.0, particularly preferably from 8 to 10.

In addition, the reaction mixture may have added to it small amounts of customary additives such as alkali metal sulfites, for example sodium disulfite and sodium sulfite, alkali metal formates, for example sodium formate, alkali metal citrates, for example sodium citrate, phosphates, polyphosphates, urea, dicyandiamide or cyanamide. They can be added as pure individual compounds or as mixtures with one another, in each case without a solvent or as aqueous solutions, before, during or after the condensation reaction.

Other modifiers are amines and also amino alcohols such as diethylamine, ethanolamine, diethanolamine or 2-diethylaminoethanol.

Further possible additives include fillers, emulsifiers and blowing agents.

The fillers used can be for example fibrous or pulverulent inorganic reinforcing agents or fillers such as glass fibers, metal powders, metal salts or silicates, for example kaolin, talc, baryte, quartz or chalk. Emulsifiers used are generally the customary nonionic, anionic or cationic organic compounds having long-chain alkyl radicals. When processing the uncured resins into foams the blowing agent used can be for example pentane.

The polycondensation can be carried out continuously or batchwise, for example in an extruder (see EP-A-355 760), in a conventional manner.

The production of articles by curing the condensation products of the present invention is customarily effected by addition of small amounts of acids such as formic acid, sulfuric acid or ammonium chloride.

To produce fibers, the melamine resin of the present invention is generally spun in a conventional manner, for example after addition of a curing agent, at room temperature in a rotospinning apparatus and subsequently the uncured fibers are cured in a heated atmosphere, or the spinning takes place in a heated atmosphere with simultaneous evaporation of the water used as solvent and curing of the condensate. Such a process is described in detail in DE-A 23 64 091.

Webs are generally produced from waddings by needling in a conventional manner. The waddings are generally produced by customary methods, for example on a roller card.

The fibers and webs colored according to the present invention are preferably used in occupational safety and fire protection, for example for manufacturing boilersuits (disadvantage to date: flameproofed cotton loses its flame resistance on repeated washing), wall coverings (for example for public buildings in which flame resistance is of paramount importance) and also more lightweight clothing for firefighters.

In a preferred embodiment, black covering webs and fabrics are manufactured for engine compartment insulation. The advantages over the corresponding prior art webs are higher thermal stability (sustained use temperature resistance at about 200° C.), the low flammability and also the fact that, unlike other fibers and webs, no flameproofing is required.

The advantages of the process of the present invention reside in making available homogeneously colored melamine-formaldehyde condensation products which, in particular on spinning into fibers, do not form fisheyes.

EXAMPLE 1 (Condensation Resin Without Added Color)

A mixture of 1871 g of melamine, 620 g of an 80% strength by weight mixture of 10 mol % of mono-, 50 mol % of bis- and 40 mol % of trishydroxyoxapentylmelamine, 472.8 g of paraformaldehyde, 38.2 g of phenol and 15.4 ml of diethylethanolamine was condensed at 98° C. in the course of 150 min to a viscosity of 500 Pa.s. Following addition of 1% by weight of formic acid, the resin was spun in a conventional manner.

EXAMPLE 2 (Batch Condensation Resin)

95 g of RCC class pigment grade carbon black (DEGUSSA) were finely dispersed over 30 min by means of an Ultraturax in a mixture of 1128.8 g of 40% strength by weight formaldehyde, 633 g of an 80% strength by weight mixture of 10 mol % of mono-, 50 mol % of bis- and 40 mol % of trishydroxyoxapentylmelamine, followed by the addition of 1746.4 g of melamine, 472.8 g of paraformaldehyde, 38.2 g of phenol, 15.4 ml of diethylethanolamine and 185 g of water. A pH of 9.4 was set with 25% strength by weight NaOH solution. The mixture was condensed at 98° C. to a viscosity of 250 Pa.s and then immediately cooled down to room temperature.

Solids content (theor.): 77% Final viscosity: 430 Pa.s

The black condensation resin was mixed with a colorless condensation resin (see Example 1) in a ratio of 1:5 and spun in a conventional manner.

EXAMPLE 3

17.2 g of Pigment Red 3 (C.I. 12120) were finely dispersed over 30 min by means of an Ultraturax in a mixture of 733 g of 40% strength by weight formaldehyde and 411 g of an 80% strength by weight mixture of 10 mol % of mono-, 50 mol % of bis- and 40 mol % of trishydroxyoxapentylmelamine, followed by the addition of 1134 g of melamine, 307 g of paraformaldehyde, 24.8 g of phenol, 5.0 ml of diethylethanolamine and 107 g of water. A pH of 8.9 was set with 25% strength by weight NaOH solution. The mixture was condensed at 98° C. to a viscosity of 250 Pa.s and then immediately cooled down to room temperature.

Solids content (theor.): 77% Final viscosity: 310 Pa.s

The orange condensation resin was spun in a conventional manner.

EXAMPLE 4

8.2 g of Pigment Yellow 183 (C.I. 18792) were finely dispersed over 30 min by means of an Ultraturax in a mixture of 733 g of 40% strength by weight formaldehyde and 411 g of an 80% strength by weight mixture of 10 mol % of mono, 50 mol % of bis- and 40 mol % of trishydroxyoxapentylmelamine, followed by the addition of 1134 g of melamine, 307 g of paraformaldehyde, 24.8 g of phenol, 5.0 ml of diethylethanolamine and 107 g of water. A pH of 8.9 was set with 25% strength by weight NaOH solution. The mixture was condensed at 98° C. to a viscosity of 250 Pa.s and then immediately cooled down to room temperature.

Solids content (theor.): 77% Final viscosity: 510 Pa.s

The yellow condensation resin was spun in a conventional manner.

EXAMPLE 5

8.2 g of Pigment Blue (15:3) (C.I. 74160) were finely dispersed over 30 min by means of an Ultraturax in a mixture of 733 g of 40% strength by weight formaldehyde and 411 g of an 80% strength by weight mixture of 10 mol % of mono-, 50 mol % of bis- and 40 mol % of trishydroxyoxapentylmelamine, followed by the addition of 1134 g of melamine, 307 g of paraformaldehyde, 24.8 g of phenol, 5.0 ml of diethylethanolamine and 107 g of water. A pH of 8.9 was set with 25% strength by weight NaOH solution. The mixture was condensed at 98° C. to a viscosity of 225 Pa.s and then immediately cooled down to room temperature.

Solids content (theor.): 77% Final viscosity: 495 Pa.s

The blue condensation resin was spun in a conventional manner.

EXAMPLE 6 (Without Aqueous Formaldehyde, Masterbatch)

90 g of RCC class pigment grade carbon black (DEGUSSA) were finely dispersed over 30 min by means of an Ultraturax in a mixture of 662 g of an 80% strength by weight mixture of 10 mol % of mono-, 50 mol % of bis- and 40 mol % of trishydroxyoxapentylmelamine and 704 g of water, followed by the addition of 1814.4 g of melamine, 960.8 g of paraformaldehyde, 39.7 g of phenol, 8.0 ml of diethylethanolamine. A pH of 8.8 was set with 25% strength by weight NaOH solution. The mixture was condensed at 98° C. to a viscosity of 660 Pa.s and then immediately cooled down to room temperature.

Solids content (theor.): 77% Final viscosity: 690 Pa.s

The black condensation resin was mixed with a colorless condensation resin (see Example 1) in a ratio of 1:5 and spun in a conventional manner.

EXAMPLE 7

Colorless condensation resin of Example 1 was admixed with 2% by weight of a curing agent mixture (mixture of 35% strength by weight formic acid, 2% by weight of an 80% strength by weight mixture of 10 mol % of mono-, 50 mol % of bis- and 40 mol % of trishydroxyoxapentylmelamine and 20% by weight of RCC class pigment grade carbon black from Degussa, intensively mixed and subsequently spun.

The viscosity measurements were carried out with a cone-plate viscometer (from Epprecht Instruments & Controls), measuring cone "type D", at a temperature of 20° C. and a shear gradient of 20/sec.

The fibers were spun by the process described in DE-A-23 64 091.

EXAMPLE 8 a) To determine the thermal stability, DIN 53 857 was followed to test a fabric produced from the fibers of Example 2 at various temperatures. The results are given in the Table below.

b) For comparison, a fabric composed of preoxidized polyacrylonitrile (SIGRAFIL® from Sigri) was tested similarly to (a). The result is given in the Table below.

TABLE

Thermal stability

| Fiber type | Residence time | Temperature | Breaking strength (rel. to breaking strength at start of test) |
|---|---|---|---|
| Black fibers of Example 2 | 6 h | 250° C. | 110% |
| Black fibers of Example 2 | 1 h | 300° C. | 110% |
| SIGRAFIL ® | 6 h | 250° C. | 50% |
| SIGRAFIL ® | 1 h | 300° C. | 0% |

We claim:

1. A process for preparing colored melamine-formaldehyde condensation products by mixing pigments or dyes into a reaction mixture comprising starting compounds for preparing the melamine-formaldehyde condensation products, which comprises (A) dispersing a mixture consisting essentially of (a) a substituted melamine of the formula I

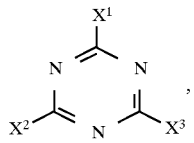

where $X^1$, $X^2$ and $X^3$ are each selected from the group consisting of $-NH_2$, $-NHR^1$ and $-NR^1R^2$, and $X^1$, $X^2$ and $X^3$ are not all $-NH_2$, and $R^1$ and $R^2$ are each selected from the group consisting of hydroxy-$C_2$-$C_{10}$-alkyl, hydroxy-$C_2$-$C_4$-alkyl-(oxa-$C_2$-$C_4$-alkyl)$_n$, where n is from 1 to 5, and amino-$C_2$-$C_{12}$-alkyl, or mixtures of melamines I, and (b) formaldehyde or formaldehyde-donating compounds in a molar ratio of formaldehyde to melamines I within the range from 40:1 to 0, (c) a pigment or dye, and (d) phenol, unsubstituted or substituted by radicals selected from the group consisting of $C_1$-$C_9$-alkyl and hydroxyl, $C_1$-$C_4$-alkanes substituted by 2 or 3 phenol groups, di(hydroxyphenyl) sulfones or mixtures thereof, the pigment or dye being added in an amount within the range from 0.01 to 30% by weight, based on (a) and (b), and the phenol in an amount within the range from 0 to 5 mol %, based on (a) and (b), by intensive stirring until there are no longer any pigment agglomerates $\geq 1$ μm, and then (B) admixing the mixture prepared in (A) with melamine and if desired with further phenol, substituted melamine I and formaldehyde or formaldehyde-donating compounds, the amounts being chosen so that the molar ratio of melamines (melamine and (a)) to (b) is within the range from 1:1.15 to 1:4.5, the pigment or dye is present in an amount within the range from 0.01 to 5% by weight, based on melamine and (a) and (b), and the phenol is present in an amount within the range from 0 to 5 mol %, based on melamine and (a) and (b), and then condensing to form the colored products.

2. A process as claimed in claim 1 wherein the dye used belongs to the class of the azo dyes, anthraquinone dyes, coumarin dyes or methine or azamethine dyes.

3. Colored melamine-formaldehyde condensation products obtained by the process of claim 1.

4. The process of claim 1 which further includes forming the colored articles into fibers or webs.

5. Webs or fibers prepared by the process of claim 4.

6. Webs in accordance with claim 5 wherein (c) is black.

7. Engine compartments insulated with the a web of claim 6.

8. The web in accordance with claim 6 wherein (c) is carbon black.

9. The process of claim 1 wherein in step (A), the molar ratio of (b) is essentially 0 and the mol % of (d) is essentially 0, and in step (B) the molar ratio of melamines (a) to (b) is within the range offrom 1:1.15 to 1:4.5.

* * * * *

UNITED STATES PATENT AND TRADEMARK OFFICE
CERTIFICATE OF CORRECTION

PATENT NO.: 5,837,013

DATED: November 17, 1998

INVENTOR(S): GUENTHER et al.

It is certified that error appears in the above-identified patent and that said Letters Patent is hereby corrected as shown below:

Col. 29, claim 1, line 41, "$C_{1-9}$" should be --$C_1$-$C_9$--.

Col. 30, claim 1, line 1, "$C_{1-4}$" should be --$C_1$-$C_4$--.

Col. 30, claim 1, line 12, delete "if desired".

Signed and Sealed this

Twenty-third Day of March, 1999

Attest:

Q. TODD DICKINSON

Attesting Officer

Acting Commissioner of Patents and Trademarks